US012695766B2

(12) United States Patent
Shriver et al.

(10) Patent No.: US 12,695,766 B2
(45) Date of Patent: Jul. 28, 2026

(54) IDENTIFYING UNAUTHORIZED ENTITIES FROM NETWORK TRAFFIC

(71) Applicant: HSBC Group Management Services Limited, London (GB)

(72) Inventors: Abigail Shriver, Miami, FL (US);
Jason Trost, Brookhaven, GA (US);
Jude Ken-Kwofie, London (GB)

(73) Assignee: HSBC Group Management Services Limited, London (GB)

( * ) Notice: Subject to any disclaimer, the term of this patent is extended or adjusted under 35 U.S.C. 154(b) by 58 days.

(21) Appl. No.: 18/984,521

(22) Filed: Dec. 17, 2024

(65) Prior Publication Data

US 2025/0286899 A1 Sep. 11, 2025

(51) Int. Cl.
*H04L 9/40* (2022.01)

(52) U.S. Cl.
CPC ................................ *H04L 63/1416* (2013.01)

(58) Field of Classification Search
CPC ........................ H04L 63/1416; H04L 63/1408
See application file for complete search history.

(56) References Cited

U.S. PATENT DOCUMENTS

| | | | | |
|---|---|---|---|---|
| 6,279,113 | B1 * | 8/2001 | Vaidya | H04L 63/1416 709/229 |
| 9,594,906 | B1 * | 3/2017 | Langton | G06F 21/564 |

| | | | | |
|---|---|---|---|---|
| 12,107,831 | B2 * | 10/2024 | Ji | H04L 63/1425 |
| 2018/0359244 | A1 * | 12/2018 | Cockerill | H04L 63/105 |
| 2020/0014708 | A1 * | 1/2020 | Cohen | H04L 63/1416 |
| 2021/0073287 | A1 * | 3/2021 | Hunter | H04L 63/123 |
| 2023/0012220 | A1 * | 1/2023 | Humphrey | H04L 41/16 |
| 2025/0286899 | A1 * | 9/2025 | Shriver | H04L 63/1416 |

\* cited by examiner

*Primary Examiner* — Ponnoreay Pich

(74) *Attorney, Agent, or Firm* — Dentons Durham Jones Pinegar

(57) ABSTRACT

Systems, methods, and devices to detect unauthorized third-party connections within a network infrastructure, such as by analyzing network traffic data using fuzzy matching and machine learning techniques. One aspect includes receiving network traffic data comprising records of communication events involving network identifiers, determining communication relationships between network entities identified by the network identifiers, accessing entity identifiers associated with known third-party systems, and determining associations between the network identifiers and the entity identifiers using a fuzzy matching process. Other aspects include identifying communication relationships involving the third-party systems based on the associations and detecting unregistered or unknown third-party connections within the network infrastructure. Further aspects include normalizing identifiers, computing string similarity metrics, assigning confidence scores, incorporating external data sources, building network association patterns, comparing current patterns to baseline patterns to detect anomalies, and updating security policies or firewall rules in response to detected anomalies. Additional aspects are provided.

20 Claims, 10 Drawing Sheets

Process identified name / network identifier mappings — 602

Query traffic relationships using network identifiers in network identifier mappings — 604

Associate third-party entities with traffic relationships using mappings — 606

Enrich relationship records — 608

Output relationship records and/or perform further analysis — 610

| Relationship | Key | Value | Description |
|---|---|---|---|
| domain_src | Domain | Src IP | representing host IPs that performed DNS lookups of domains |
| src_domain | Src IP | Domain | |
| Src_dest_connection | Src IP | Dest IP | representing src IPs that succeeded in communications with dst IPs |
| Dest_src_connection | Dest IP | Src IP | |
| Src_dest_blocked | Src IP | Dest IP | representing src IPs that attempted communications with dst IPs but it was blocked |
| Dest_src_blocked | Dest IP | Src IP | |
| Domain_ip | Domain | IP | representing DNS A records |
| Ip_domain | IP | Domain | |
| Domain_process | Domain | Process | representing processes that performed DNS lookups of domains |
| Process_domain | Process | Domain | |

FIGURE 7A

| Name | Data Type |
| --- | --- |
| id | string |
| name | string |
| status | string |

FIGURE 7B

| Name | Data Type |
| --- | --- |
| domain | string |
| tld | string |
| registrant:email | string |
| registrant:name | string |
| registrant:org | string |
| registrant:street | string |
| registrant:city | string |
| registrant:state | string |
| registrant:zip | string |
| registrant:country | string |

FIGURE 7C

| Name | Data Type |
| --- | --- |
| netRange:netName | string |
| netRange:ipStart | integer |
| netRange:ipEnd | integer |
| registrant:email | string |
| registrant:name | string |
| registrant:org | string |
| registrant:street | string |
| registrant:city | string |
| registrant:state | string |
| registrant:zip | string |
| registrant:country | string |

FIGURE 7D

| Name | Data Type |
|------|-----------|
| Hostname | string |
| CommandLine | string |
| ImageFilename | string |
| timestamp | DATETIME |
| UserSid | string |
| ProcessID | int |
| ParentCommandLine | string |
| ParentProcessID | int |

FIGURE 7E

| Name | Data Type |
|------|-----------|
| uri_host | string |
| src_ip | string |
| dest_ip | string |
| timestamp | DATETIME |
| uri | string |
| user_agent | string |
| dest_port | int |
| action | string |

FIGURE 7F

| Name | Data Type |
|------|-----------|
| src_ip | string |
| dest_ip | string |
| src_port | integer |
| dest_port | integer |
| timestamp | DATETIME |
| action | string |

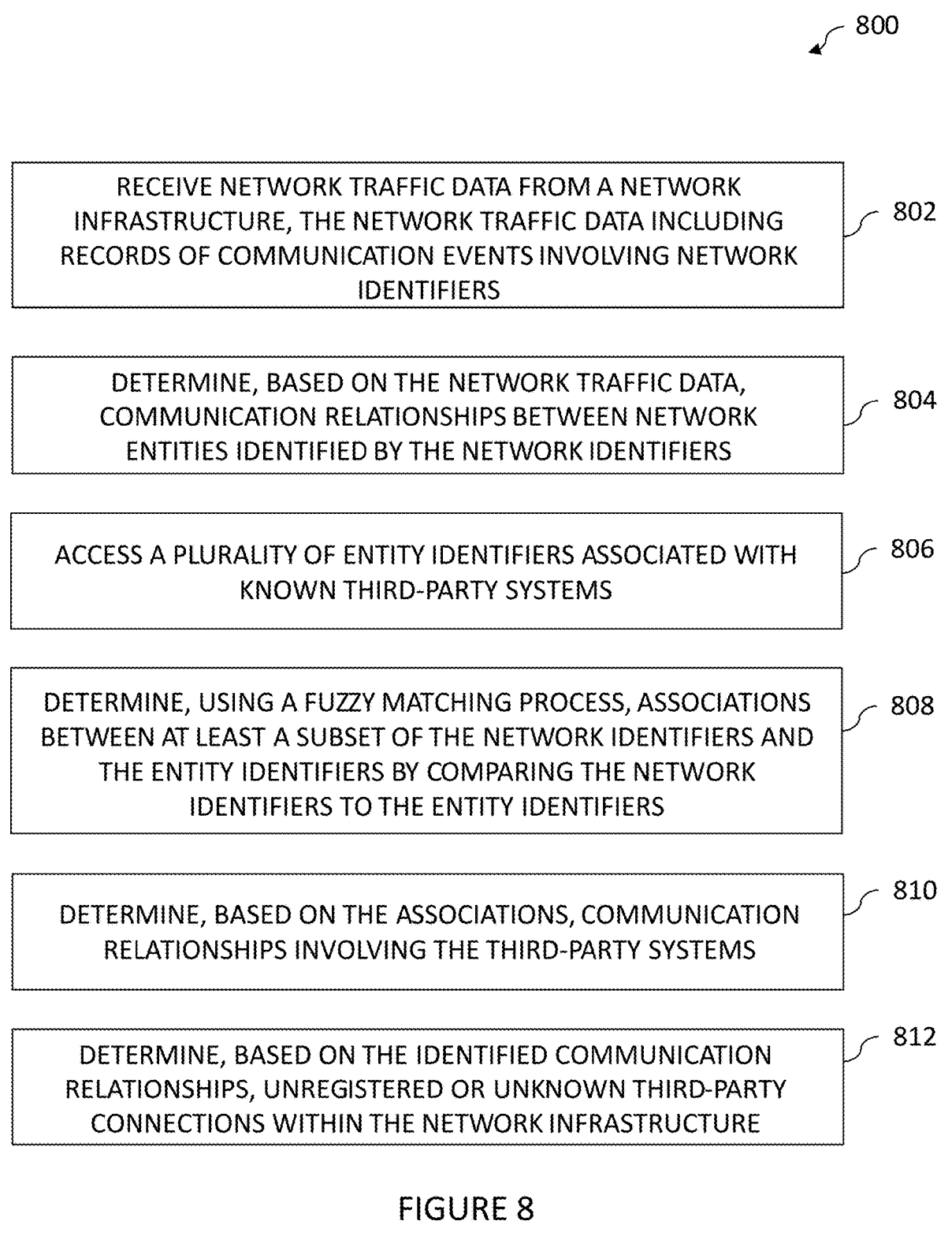

| RECEIVE NETWORK TRAFFIC DATA FROM A NETWORK INFRASTRUCTURE, THE NETWORK TRAFFIC DATA INCLUDING RECORDS OF COMMUNICATION EVENTS INVOLVING NETWORK IDENTIFIERS | 802 |

| DETERMINE, BASED ON THE NETWORK TRAFFIC DATA, COMMUNICATION RELATIONSHIPS BETWEEN NETWORK ENTITIES IDENTIFIED BY THE NETWORK IDENTIFIERS | 804 |

| ACCESS A PLURALITY OF ENTITY IDENTIFIERS ASSOCIATED WITH KNOWN THIRD-PARTY SYSTEMS | 806 |

| DETERMINE, USING A FUZZY MATCHING PROCESS, ASSOCIATIONS BETWEEN AT LEAST A SUBSET OF THE NETWORK IDENTIFIERS AND THE ENTITY IDENTIFIERS BY COMPARING THE NETWORK IDENTIFIERS TO THE ENTITY IDENTIFIERS | 808 |

| DETERMINE, BASED ON THE ASSOCIATIONS, COMMUNICATION RELATIONSHIPS INVOLVING THE THIRD-PARTY SYSTEMS | 810 |

| DETERMINE, BASED ON THE IDENTIFIED COMMUNICATION RELATIONSHIPS, UNREGISTERED OR UNKNOWN THIRD-PARTY CONNECTIONS WITHIN THE NETWORK INFRASTRUCTURE | 812 |

FIGURE 8

IDENTIFYING UNAUTHORIZED ENTITIES FROM NETWORK TRAFFIC

FIELD

The present application relates to techniques for processing and analysing data relating to network traffic data involving interprocess communications within computer and communications networks. In particular, the application describes techniques for identifying entities involved in communication interactions by processing network traffic data that includes diverse types of communication events and protocols across different layers of the Open Systems Interconnection (OSI) model, including fuzzy matching algorithms and machine learning models, to correlate network identifiers with entity identifiers, thereby enabling accurate identification of third-party entities involved in complex network interactions.

INTRODUCTION

Events in a computer network, such as packet transmissions, connection establishment, information requests/responses and other protocol exchanges typically identify participants (e.g. senders/receivers) by reference to low-level network identifiers such as IP addresses, MAC addresses, domain names etc. However, while such low-level identifiers can allow specific devices involved in network events to be identified and analysed (e.g. for security monitoring or enforcement purposes) it is difficult to identify real-world participant entities from such information. Particular entities operating within a network may use many different devices and associated network addresses and domains. However, proper security awareness and enforcement of security policies may require knowledge of the actors behind those low-level identifiers which are not readily obtainable from the low-level traffic information in the network.

SUMMARY

The present techniques provide systems and methods for identifying entities associated with third-party network traffic by processing and analyzing network traffic data using advanced computational approaches. These techniques involve collecting network traffic records, determining communication relationships between network entities, and employing fuzzy matching processes to associate network identifiers, such as IP addresses and domain names, with specific third-party entities. By integrating additional data sources, including network registries and threat intelligence feeds, the techniques aim to accurately map network interactions to external entities, detect unregistered or unknown third-party connections, and enhance network security by enabling organizations to manage third-party risks effectively.

In particular, in modern network environments, organizations often interact with numerous third-party applications and services, some of which may communicate indirectly through sub-vendors or utilize dynamic network infrastructures. Existing techniques typically rely on direct mappings of network identifiers to registered entities, assuming that all external connections are known and properly documented. Network traffic logs and security systems generally record communication events using raw network identifiers like IP addresses and domain names without providing clear associations to the underlying entities responsible for the communications.

Such methods face challenges in accurately identifying unregistered or unknown third-party connections within a network infrastructure. Variations in naming conventions, misspellings, use of dynamic IP addresses, proxy servers, and encrypted connections can obscure the true source or destination of network traffic. Additionally, advanced networking features like protocol encapsulation and tunneling may further mask the actual endpoints involved in communications.

The inability to accurately map network identifiers to specific entities poses significant cybersecurity risks, including unauthorized access, data breaches, and exposure to malicious activities such as advanced persistent threats and botnets. Organizations struggle to detect anomalies in communication patterns or identify when a demised third-party relationship continues to have active connections, leading to potential vulnerabilities and compliance issues.

One solution to this problem is to employ a combination of data processing methods, including fuzzy matching algorithms and machine learning models, to correlate network identifiers with third-party entity identifiers. The present techniques normalize and analyze network traffic data across different network layers, handling variations in network identifiers by applying string similarity metrics and natural language processing methods. By integrating data from network registries, such as domain and IP WHOIS databases, the techniques enhance entity identification even when direct mappings are unavailable.

The techniques involve generating associations between network identifiers and entity names using fuzzy matching processes, assigning confidence scores to these associations, and updating communication relationship records with the associated entities. This approach allows for the detection of unregistered or unknown third-party connections by identifying network traffic that does not match any known entities. Additionally, by building current and baseline network association patterns, these techniques can detect anomalies and collisions in communication behaviors, enabling organizations to respond proactively to potential threats.

In some aspects, the present disclosure provides techniques for accurately identifying entities involved in network communications that may be particularly beneficial in enhancing network security and managing third-party risks. For example, by employing fuzzy matching and machine learning models to correlate network identifiers with entity names, organizations may detect unauthorized or unknown external connections that were previously difficult to identify using traditional methods.

These techniques may improve the functioning of security systems by providing comprehensive insights into network interactions, allowing for more effective monitoring and anomaly detection. End users may benefit from increased protection against cybersecurity threats, as the organization can promptly identify and mitigate potential vulnerabilities. Furthermore, the ability to automate the analysis and integrate with existing security policies may lead to more efficient network management and reduced operational overhead.

Additional aspects of the invention are set out below.

In a first aspect, a method includes receiving network traffic data from a network infrastructure, the network traffic data including records of communication events involving network identifiers; determining, based on the network traffic data, communication relationships between network entities identified by the network identifiers; accessing a plurality of entity identifiers associated with known third-party systems; determining, using a fuzzy matching process, associations between at least a subset of the network identifiers and the entity identifiers by comparing the network identifiers to the entity identifiers, wherein the entity identifiers are associated with the known third-party systems; determining, based on the associations, communication relationships involving the third-party systems; and determining, based on the identified communication relationships, unregistered or unknown third-party connections within the network infrastructure.

In a second aspect according to the first aspect, the fuzzy matching process includes computing a string similarity metric between normalized versions of the network identifiers and the entity identifiers.

In a third aspect according to the second aspect, normalizing the network identifiers and the entity identifiers includes converting the identifiers to a standard case, removing punctuation characters, removing numerical digits, removing legal entity abbreviations, removing whitespace characters, or a combination thereof.

In a fourth aspect according to any one of the second or third aspects, the string similarity metric is a Jaro-Winkler distance metric.

In a fifth aspect according to any one of the first through fourth aspects, determining the associations using the fuzzy matching process further includes generating feature vectors for the network identifiers and the entity identifiers based on character n-grams and tokenization; inputting the feature vectors into a machine learning model trained to predict similarity scores; and determining the associations based on the similarity scores exceeding a predefined threshold.

In a sixth aspect according to any one of the first through fifth aspects, the method further includes assigning confidence scores to the associations based on one or more string similarity metrics from the fuzzy matching process; and retaining associations with confidence scores above a predetermined confidence threshold.

In a seventh aspect according to any one of the first through sixth aspects, the method further includes receiving additional data from one or more external data sources, the additional data including network registry information, domain ownership records, IP address ownership records, or a combination thereof; and determining the associations at least in part based on the additional data.

In an eighth aspect according to the seventh aspect, determining the associations includes processing the additional data using a machine learning model configured to extract relevant network identifiers and entity identifiers; and updating the associations based on the extracted information.

In a ninth aspect according to the eighth aspect, processing the additional data using the machine learning model includes applying natural language processing techniques to parse unstructured or semi-structured data; extracting entity names and associated network identifiers from the additional data; and normalizing the extracted entity names and network identifiers before updating the associations.

In a tenth aspect according to any one of the seventh through ninth aspects, the external data sources include one or more threat intelligence feeds, and determining the associations based on the additional data includes receiving indicators of compromise (IOCs) from one or more of the threat intelligence feeds, wherein the IOCs include malicious IP addresses, malicious domains, attack signatures, or a combination thereof; correlating the IOCs with network identifiers in the network traffic data; and updating associations and communication relationships based on matches with IOCs.

In an eleventh aspect according to any one of the first through tenth aspects, the method further includes using the associations to identify additional network identifiers related to the entity identifiers; updating the network traffic data and communication relationships with the additional network identifiers; and repeating the fuzzy matching process with the updated set of network identifiers to determine updated associations.

In a twelfth aspect according to any one of the first through eleventh aspects, the method further includes building current network association patterns for the entity identifiers based on the associations, wherein each current network association pattern represents communication behaviors associated with a specific entity identifier.

In a thirteenth aspect according to the twelfth aspect, building the current network association patterns includes aggregating communication relationships associated with each entity identifier over a predefined time window; calculating statistical metrics including communication frequency, data transfer volumes, connection timings, and common communication counterparts; and storing the aggregated data as the current network association pattern for the entity identifier.

In a fourteenth aspect according to the twelfth aspect, the method further includes establishing baseline network association patterns for the entity identifiers based on historical network traffic data.

In a fifteenth aspect according to the fourteenth aspect, establishing the baseline network association patterns includes analyzing historical communication relationships over an extended time period; determining, based on the historical communication relationships, typical communication behaviors including regular connection intervals, standard data volumes, and consistent communication partners; and storing the derived metrics as the baseline network association pattern for each entity identifier.

In a sixteenth aspect according to the twelfth aspect, the method further includes comparing the current network association patterns to the baseline network association patterns for the entity identifiers; and detecting one or more anomalies based on the comparison.

In a seventeenth aspect according to the sixteenth aspect, detecting the one or more anomalies includes recognizing new communication partners or destinations not previously associated with the entity identifiers.

In an eighteenth aspect according to the sixteenth aspect, the method further includes, in response to detecting the one or more anomalies, performing at least one automated action including generating an alert, automatically updating security policies or firewall rules to mitigate potential threats, isolating affected network entities or connections pending further investigation, or a combination thereof.

In a nineteenth aspect according to the twelfth aspect, the method further includes detecting collisions between network association patterns associated with different entity identifiers by identifying network identifiers that match multiple entity identifiers in the fuzzy matching process.

In a twentieth aspect according to the nineteenth aspect, detecting collisions includes analyzing overlapping associations where a network identifier is linked to multiple entity identifiers; and assigning collision scores based on the degree of overlap.

In a twenty-first aspect according to any one of the first through twentieth aspects, the method further includes comparing current security policies and firewall rules to the communication relationships identified for each entity identifier; identifying discrepancies between allowed connections and observed access patterns; and determining an updated security rule based on the discrepancies.

In a twenty-second aspect according to the twenty-first aspect, comparing current security policies includes retrieving existing firewall rules related to a specific third-party system; analyzing the rules to determine permitted network identifiers and connection parameters; and comparing the permitted network identifiers and connection parameters with the actual communication relationships observed in the network traffic data.

In a twenty-third aspect according to the twenty-first aspect, determining an updated security rule includes identifying that the observed access patterns involve network identifiers not specified in the current security policies; and determining the updated security rule to restrict or permit access based on the observed communication relationships.

In a twenty-fourth aspect according to the twenty-third aspect, determining an updated security rule includes detecting an entity identifier that is identified as demised with one or more active connections; and determining the updated security rule to revoke access for the demised entity identifier.

In a twenty-fifth aspect according to any one of the first through twenty-fourth aspects, the method further includes providing an application programming interface (API) to integrate with external systems, wherein the API delivers real-time notifications of detected anomalies, unregistered connections, security policy recommendations, or a combination thereof.

In a twenty-sixth aspect according to any one of the first through twenty-fifth aspects, determining the communication relationships includes representing the communication relationships in a graph database, wherein nodes represent the network entities identified by the network identifiers; and edges represent the communication events or relationships between the network entities, including attributes such as communication type, frequency, and data volume.

In a twenty-seventh aspect, a system includes a processor and a memory storing instructions which, when executed by the processor, cause the processor to perform operations including receiving network traffic data from a network infrastructure, the network traffic data including records of communication events involving network identifiers; determining, based on the network traffic data, communication relationships between network entities identified by the network identifiers; accessing a plurality of entity identifiers associated with known third-party systems; determining, using a fuzzy matching process, associations between at least a subset of the network identifiers and the entity identifiers by comparing the network identifiers to the entity identifiers, wherein the entity identifiers are associated with the known third-party systems; determining, based on the associations, communication relationships involving the third-party systems; and determining, based on the identified communication relationships, unregistered or unknown third-party connections within the network infrastructure.

In a twenty-eighth aspect according to the twenty-seventh aspect, the fuzzy matching process includes computing a string similarity metric between normalized versions of the network identifiers and the entity identifiers.

In a twenty-ninth aspect according to the twenty-eighth aspect, normalizing the network identifiers and the entity identifiers includes converting the identifiers to a standard case, removing punctuation characters, removing numerical digits, removing legal entity abbreviations, removing whitespace characters, or a combination thereof.

In a thirtieth aspect according to any one of the twenty-eighth or twenty-ninth aspects, the string similarity metric is a Jaro-Winkler distance metric.

In a thirty-first aspect according to any one of the twenty-seventh through thirtieth aspects, determining the associations using the fuzzy matching process further includes generating feature vectors for the network identifiers and the entity identifiers based on character n-grams and tokenization; inputting the feature vectors into a machine learning model trained to predict similarity scores; and determining the associations based on the similarity scores exceeding a predefined threshold.

In a thirty-second aspect according to any one of the twenty-seventh through thirty-first aspects, the system further causes the processor to assign confidence scores to the associations based on one or more string similarity metrics from the fuzzy matching process; and retain associations with confidence scores above a predetermined confidence threshold.

In a thirty-third aspect according to any one of the twenty-seventh through thirty-second aspects, the system further causes the processor to receive additional data from one or more external data sources, the additional data including network registry information, domain ownership records, IP address ownership records, or a combination thereof; and determine the associations at least in part based on the additional data.

In a thirty-fourth aspect according to the thirty-third aspect, determining the associations includes processing the additional data using a machine learning model configured to extract relevant network identifiers and entity identifiers; and updating the associations based on the extracted information.

In a thirty-fifth aspect according to the thirty-fourth aspect, processing the additional data using the machine learning model includes applying natural language processing techniques to parse unstructured or semi-structured data; extracting entity names and associated network identifiers from the additional data; and normalizing the extracted entity names and network identifiers before updating the associations.

In a thirty-sixth aspect according to the thirty-third aspect, the external data sources include one or more threat intelligence feeds, and determining the associations based on the additional data includes receiving indicators of compromise (IOCs) from one or more of the threat intelligence feeds, wherein the IOCs include malicious IP addresses, malicious domains, attack signatures, or a combination thereof; correlating the IOCs with network identifiers in the network traffic data; and updating associations and communication relationships based on matches with IOCs.

In a thirty-seventh aspect according to any one of the twenty-seventh through thirty-sixth aspects, the system further causes the processor to use the associations to identify additional network identifiers related to the entity identifiers; update the network traffic data and communication relationships with the additional network identifiers; and repeat the fuzzy matching process with the updated set of network identifiers to determine updated associations.

In a thirty-eighth aspect according to any one of the twenty-seventh through thirty-seventh aspects, the system further causes the processor to build current network association patterns for the entity identifiers based on the associations, wherein each current network association pattern represents communication behaviors associated with a specific entity identifier.

In a thirty-ninth aspect according to the thirty-eighth aspect, building the current network association patterns includes aggregating communication relationships associated with each entity identifier over a predefined time window; calculating statistical metrics including communication frequency, data transfer volumes, connection timings, and common communication counterparts; and storing the aggregated data as the current network association pattern for the entity identifier.

In a fortieth aspect according to the thirty-eighth aspect, the system further causes the processor to establish baseline network association patterns for the entity identifiers based on historical network traffic data.

In a forty-first aspect according to the fortieth aspect, establishing the baseline network association patterns includes analyzing historical communication relationships over an extended time period; determining, based on the historical communication relationships, typical communication behaviors including regular connection intervals, standard data volumes, and consistent communication partners; and storing the derived metrics as the baseline network association pattern for each entity identifier.

In a forty-second aspect according to the thirty-eighth aspect, the system further causes the processor to compare the current network association patterns to the baseline network association patterns for the entity identifiers; and detect one or more anomalies based on the comparison.

In a forty-third aspect according to the forty-second aspect, detecting the one or more anomalies includes recognizing new communication partners or destinations not previously associated with the entity identifiers.

In a forty-fourth aspect according to the forty-second aspect, the system further causes the processor, in response to detecting the one or more anomalies, to perform at least one automated action including generating an alert, automatically updating security policies or firewall rules to mitigate potential threats, isolating affected network entities or connections pending further investigation, or a combination thereof.

In a forty-fifth aspect according to the thirty-eighth aspect, the system further causes the processor to detect collisions between network association patterns associated with different entity identifiers by identifying network identifiers that match multiple entity identifiers in the fuzzy matching process.

In a forty-sixth aspect according to the forty-fifth aspect, detecting collisions includes analyzing overlapping associations where a network identifier is linked to multiple entity identifiers; and assigning collision scores based on the degree of overlap.

In a forty-seventh aspect according to any one of the twenty-seventh through forty-sixth aspects, the system further causes the processor to compare current security policies and firewall rules to the communication relationships identified for each entity identifier; identify discrepancies between allowed connections and observed access patterns; and determine an updated security rule based on the discrepancies.

In a forty-eighth aspect according to the forty-seventh aspect, comparing current security policies includes retrieving existing firewall rules related to a specific third-party system; analyzing the rules to determine permitted network identifiers and connection parameters; and comparing the permitted network identifiers and connection parameters with the actual communication relationships observed in the network traffic data.

In a forty-ninth aspect according to the forty-seventh aspect, determining an updated security rule includes identifying that the observed access patterns involve network identifiers not specified in the current security policies; and determining the updated security rule to restrict or permit access based on the observed communication relationships.

In a fiftieth aspect according to the forty-ninth aspect, determining an updated security rule includes detecting an entity identifier that is identified as demised with one or more active connections; and determining the updated security rule to revoke access for the demised entity identifier.

In a fifty-first aspect according to any one of the twenty-seventh through fiftieth aspects, the system further causes the processor to provide an application programming interface (API) to integrate with external systems, wherein the API delivers real-time notifications of detected anomalies, unregistered connections, security policy recommendations, or a combination thereof.

In a fifty-second aspect according to any one of the twenty-seventh through fifty-first aspects, determining the communication relationships includes representing the communication relationships in a graph database, wherein nodes represent the network entities identified by the network identifiers; and edges represent the communication events or relationships between the network entities, including attributes such as communication type, frequency, and data volume.

In a fifty-third aspect, a non-transitory, computer-readable medium stores instructions which, when executed by a processor, cause the processor to perform operations including receiving network traffic data from a network infrastructure, the network traffic data including records of communication events involving network identifiers; determining, based on the network traffic data, communication relationships between network entities identified by the network identifiers; accessing a plurality of entity identifiers associated with known third-party systems; determining, using a fuzzy matching process, associations between at least a subset of the network identifiers and the entity identifiers by comparing the network identifiers to the entity identifiers, wherein the entity identifiers are associated with the known third-party systems; determining, based on the associations, communication relationships involving the third-party systems; and determining, based on the identified communication relationships, unregistered or unknown third-party connections within the network infrastructure.

In a fifty-fourth aspect according to the fifty-third aspect, the fuzzy matching process includes computing a string similarity metric between normalized versions of the network identifiers and the entity identifiers.

In a fifty-fifth aspect according to the fifty-fourth aspect, normalizing the network identifiers and the entity identifiers includes converting the identifiers to a standard case, removing punctuation characters, removing numerical digits, removing legal entity abbreviations, removing whitespace characters, or a combination thereof.

In a fifty-sixth aspect according to any one of the fifty-fourth or fifty-fifth aspects, the string similarity metric is a Jaro-Winkler distance metric.

In a fifty-seventh aspect according to any one of the fifty-third through fifty-sixth aspects, determining the associations using the fuzzy matching process further includes generating feature vectors for the network identifiers and the entity identifiers based on character n-grams and tokenization; inputting the feature vectors into a machine learning model trained to predict similarity scores; and determining the associations based on the similarity scores exceeding a predefined threshold.

In a fifty-eighth aspect according to any one of the fifty-third through fifty-seventh aspects, the operations further include assigning confidence scores to the associations based on one or more string similarity metrics from the fuzzy matching process; and retaining associations with confidence scores above a predetermined confidence threshold.

In a fifty-ninth aspect according to any one of the fifty-third through fifty-eighth aspects, the operations further include receiving additional data from one or more external data sources, the additional data including network registry information, domain ownership records, IP address ownership records, or a combination thereof; and determining the associations at least in part based on the additional data.

In a sixtieth aspect according to the fifty-ninth aspect, determining the associations includes processing the additional data using a machine learning model configured to extract relevant network identifiers and entity identifiers; and updating the associations based on the extracted information.

In a sixty-first aspect according to the sixtieth aspect, processing the additional data using the machine learning model includes applying natural language processing techniques to parse unstructured or semi-structured data; extracting entity names and associated network identifiers from the additional data; and normalizing the extracted entity names and network identifiers before updating the associations.

In a sixty-second aspect according to the fifty-ninth aspect, the external data sources include one or more threat intelligence feeds, and determining the associations based on the additional data includes receiving indicators of compromise (IOCs) from one or more of the threat intelligence feeds, wherein the IOCs include malicious IP addresses, malicious domains, attack signatures, or a combination thereof; correlating the IOCs with network identifiers in the network traffic data; and updating associations and communication relationships based on matches with IOCs.

In a sixty-third aspect according to any one of the fifty-third through sixty-second aspects, the operations further include using the associations to identify additional network identifiers related to the entity identifiers; updating the network traffic data and communication relationships with the additional network identifiers; and repeating the fuzzy matching process with the updated set of network identifiers to determine updated associations.

In a sixty-fourth aspect according to any one of the fifty-third through sixty-third aspects, the operations further include building current network association patterns for the entity identifiers based on the associations, wherein each current network association pattern represents communication behaviors associated with a specific entity identifier.

In a sixty-fifth aspect according to the sixty-fourth aspect, building the current network association patterns includes aggregating communication relationships associated with each entity identifier over a predefined time window; calculating statistical metrics including communication frequency, data transfer volumes, connection timings, and common communication counterparts; and storing the aggregated data as the current network association pattern for the entity identifier.

In a sixty-sixth aspect according to the sixty-fourth aspect, the operations further include establishing baseline network association patterns for the entity identifiers based on historical network traffic data.

In a sixty-seventh aspect according to the sixty-sixth aspect, establishing the baseline network association patterns includes analyzing historical communication relationships over an extended time period; determining, based on the historical communication relationships, typical communication behaviors including regular connection intervals, standard data volumes, and consistent communication partners; and storing the derived metrics as the baseline network association pattern for each entity identifier.

In a sixty-eighth aspect according to the sixty-fourth aspect, the operations further include comparing the current network association patterns to the baseline network association patterns for the entity identifiers; and detecting one or more anomalies based on the comparison.

In a sixty-ninth aspect according to the sixty-eighth aspect, detecting the one or more anomalies includes recognizing new communication partners or destinations not previously associated with the entity identifiers.

In a seventieth aspect according to the sixty-eighth aspect, the operations further include, in response to detecting the one or more anomalies, performing at least one automated action including generating an alert, automatically updating security policies or firewall rules to mitigate potential threats, isolating affected network entities or connections pending further investigation, or a combination thereof.

In a seventy-first aspect according to the sixty-fourth aspect, the operations further include detecting collisions between network association patterns associated with different entity identifiers by identifying network identifiers that match multiple entity identifiers in the fuzzy matching process.

In a seventy-second aspect according to the seventy-first aspect, detecting collisions includes analyzing overlapping associations where a network identifier is linked to multiple entity identifiers; and assigning collision scores based on the degree of overlap. In a seventy-third aspect according to any one of the fifty-third through seventy-second aspects, the operations further include comparing current security policies and firewall rules to the communication relationships identified for each entity identifier; identifying discrepancies between allowed connections and observed access patterns; and determining an updated security rule based on the discrepancies.

In a seventy-fourth aspect according to the seventy-third aspect, comparing current security policies includes retrieving existing firewall rules related to a specific third-party system; analyzing the rules to determine permitted network identifiers and connection parameters; and comparing the permitted network identifiers and connection parameters with the actual communication relationships observed in the network traffic data.

In a seventy-fifth aspect according to the seventy-third aspect, determining an updated security rule includes identifying that the observed access patterns involve network identifiers not specified in the current security policies; and determining the updated security rule to restrict or permit access based on the observed communication relationships.

In a seventy-sixth aspect according to the seventy-fifth aspect, determining an updated security rule includes detecting an entity identifier that is identified as demised with one or more active connections; and determining the updated security rule to revoke access for the demised entity identifier.

In a seventy-seventh aspect according to any one of the fifty-third through seventy-sixth aspects, the operations further include providing an application programming interface (API) to integrate with external systems, wherein the API delivers real-time notifications of detected anomalies, unregistered connections, security policy recommendations, or a combination thereof.

In a seventy-eighth aspect according to any one of the fifty-third through seventy-seventh aspects, determining the communication relationships includes representing the communication relationships in a graph database, wherein nodes represent the network entities identified by the network identifiers; and edges represent the communication events or relationships between the network entities, including attributes such as communication type, frequency, and data volume.

The disclosure also encompasses a system having means, optionally comprising one or more processors with associated memory, for performing any method as set out herein, and a computer program or computer-readable medium comprising software code adapted, when executed by a data processing system, to perform any method as set out herein. In particular, the disclosure may encompasses a system implemented within a data center environment, comprising physical hardware components such as servers equipped with one or more processors (e.g., CPUs, GPUs) with associated memory modules, high-speed network interface cards (NICs), and storage devices. Such implementations can include specialized equipment for capturing network traffic data, such as network taps, port mirroring configurations on switches, or dedicated packet capture appliances integrated into the physical network infrastructure. The system operates in conjunction with physical routers, firewalls, and proxy servers to collect traffic data from various segments of the network. Additionally, the system may employ distributed computing frameworks and storage systems to handle large volumes of data, utilizing technologies like Hadoop or Apache Spark for data processing and analysis. In certain aspects, analytics server and associated databases are deployed within the data center's secure environment to perform one or more of the processing steps.

Any feature in one aspect of the invention may be applied to other aspects of the invention, in any appropriate combination. In particular, method aspects may be applied to system aspects, and vice versa.

BRIEF DESCRIPTION OF THE FIGURES

Certain embodiments of the invention will now be described by way of example only, in relation to the Figures, wherein:

FIGS. 7A-7G illustrate data structures used for gathering and processing data according to one or more aspects of the present disclosure;

FIG. 8 illustrates a process for analysing network traffic data according to one aspect of the present disclosure.

DETAILED DESCRIPTION

Figure 1:
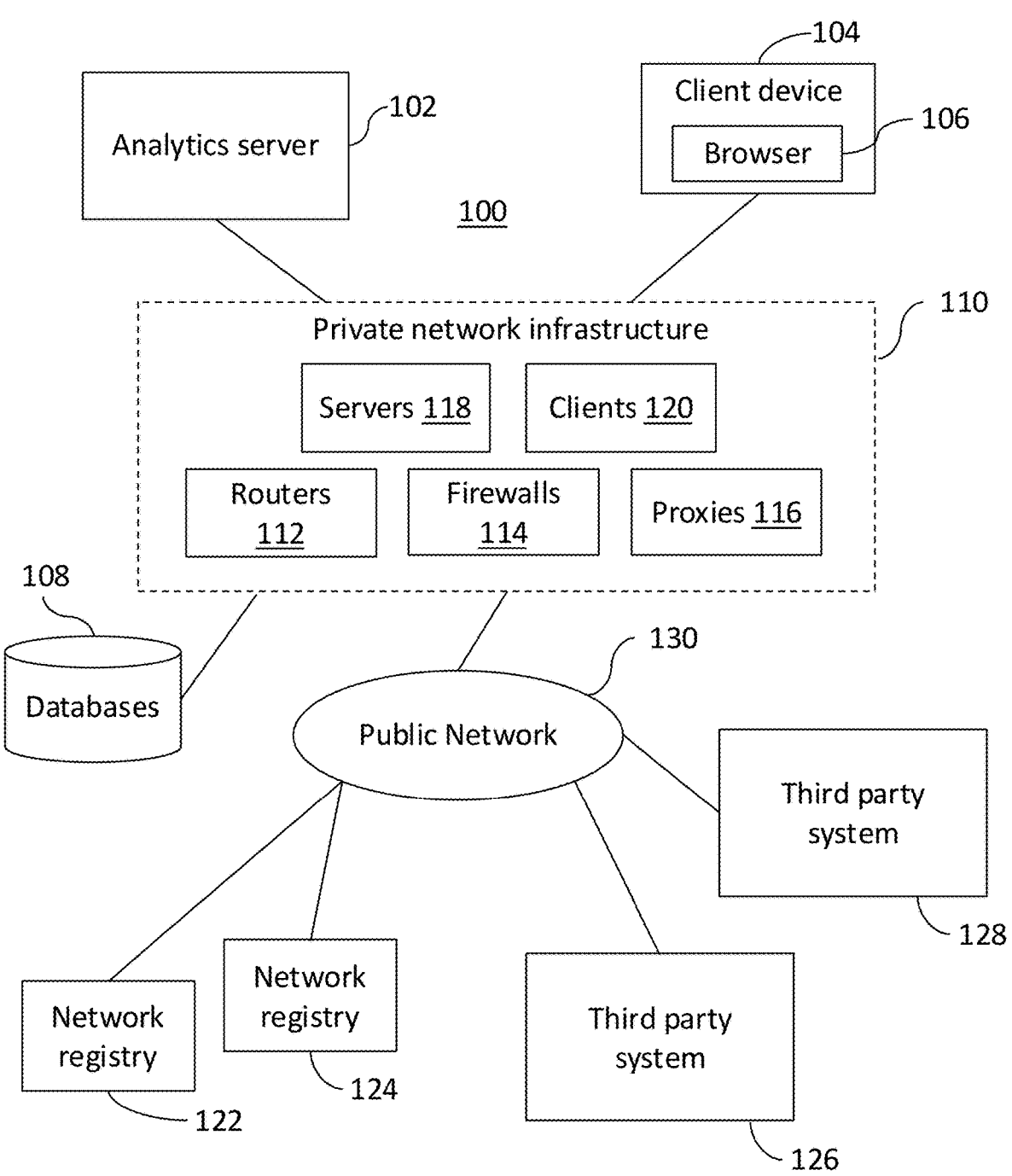
FIG. 1 illustrates a system for analysing network traffic data according to one aspect of the present disclosure.

Aspects of the present disclosure provide a system and method for identifying entities associated with third-party network traffic by processing and analyzing network traffic data using advanced computational techniques. Third-party network traffic generally includes communications between a network of interest that is being monitored (e.g., a network operated by an organization) and one or more external systems operated by third parties or separate organizations. The techniques described in the present disclosure address the technical problem of accurately mapping network identifiers, such as IP addresses and domain names, to specific third-party entities in the presence of complex network interactions and data inconsistencies. This problem is exacerbated in modern network environments where third-party applications and services may communicate indirectly through sub-vendors or utilize dynamic network infrastructures, making it challenging to identify the underlying entities responsible for network communications.

One of the primary technical challenges addressed by the invention is the identification of unregistered or unknown third-party connections within a network infrastructure. These connections pose significant cybersecurity risks, including unauthorized access, data exfiltration, and exposure to malicious activities such as advanced persistent threats (APTs), botnets, and supply chain attacks. For example, a third-party application might inadvertently communicate with a malicious server due to misconfiguration or exploitation of vulnerabilities, leading to potential compromise of sensitive data or intrusion into the network.

The described techniques employ a combination of data processing methods, including fuzzy matching algorithms, machine learning models, and natural language processing (NLP) techniques, to correlate network identifiers with entity identifiers. By normalizing and analyzing network traffic data across different layers of the OSI model, the techniques can handle variations in naming conventions, misspellings, and discrepancies in network identifiers. The use of supervised and unsupervised machine learning models enhances the ability to detect patterns, anomalies, and potential security risks associated with third-party network traffic.

By integrating additional data sources such as domain and IP WHOIS databases, network registries, and threat intelligence feeds, the system enhances the accuracy of entity identification and enables proactive security measures. The present techniques can detect anomalies in communication patterns, such as unexpected increases in data transfer volumes, deviations in communication frequency, or interactions with previously unknown entities, allowing organizations to identify and respond to cybersecurity threats in real time. Furthermore, the present techniques facilitate the updating of security policies and firewall rules by providing detailed insights into network interactions and highlighting discrepancies between observed network traffic and existing security configurations.

These techniques may result in improved network security through the accurate identification of entities involved in network communications, enabling organizations to manage third-party risks effectively. By providing a comprehensive understanding of network interactions at a deep technical level, the system supports the detection and mitigation of specific cybersecurity risks, such as unauthorized access, data breaches, malware propagation, and insider threats. Additionally, the system's ability to process large volumes of network data efficiently and integrate with existing security infrastructure makes it a scalable and practical solution for modern enterprise environments.

The techniques proposed herein can be utilized for a number of different use cases that are integrated into practical, real-world applications, addressing cybersecurity challenges associated with third-party network traffic analysis. In particular, the approaches are employed to accurately map network identifiers, such as IP addresses and domain names, to specific third-party entities within complex network environments, enhancing the security posture of an organization.

For example, consider a financial institution that partners with multiple third-party vendors for services like payment processing and fraud detection. The institution's network communicates with these vendors' systems, but inconsistent naming conventions and dynamic IP addresses make it difficult to track these interactions accurately. By implementing the proposed techniques, the institution can precisely map network traffic to specific vendors, ensuring that only authorized communications occur.

In one example, an organization operates a private network infrastructure that interfaces with various third-party systems over the public network (e.g., the Internet). These third-party systems may include vendors providing services such as vulnerability management, payment processing, or cloud-based applications. Devices within the private network, such as servers and client devices, communicate with these external systems, and the interactions may involve indirect communications through sub-vendors or dynamic network infrastructures.

For instance, a healthcare organization uses a cloud-based Electronic Health Record (EHR) system provided by a third-party vendor. The EHR system frequently communicates with sub-vendors for services like patient data analytics and appointment scheduling. Using the techniques described herein, the organization can monitor and verify all network traffic between its network and these sub-vendors, ensuring compliance with healthcare data regulations like HIPAA.

The approaches proposed herein utilize advanced computational techniques, including fuzzy matching algorithms, machine learning models, and natural language processing techniques, to process and analyze network traffic data. By normalizing and analyzing network traffic across different layers of the OSI model, the system can handle variations in naming conventions, misspellings, and discrepancies in network identifiers. This allows the system to correlate network identifiers with entity identifiers accurately, even in the presence of data inconsistencies and complex network interactions.

As a specific example, an e-commerce company might notice unusual traffic to domains with slightly misspelled names of known vendors, such as "paymntgateway.com" instead of "paymentgateway.com." The system's fuzzy matching algorithms detect these anomalies and alert the security team to potential phishing or typo-squatting attacks targeting the company's network.

From a practical perspective, the system can detect unregistered or unknown third-party connections within the network infrastructure. For instance, if a third-party application within the organization's network inadvertently communicates with a malicious server due to misconfigurations or exploitation of vulnerabilities, the system can identify this unauthorized connection by accurately mapping the network identifiers involved. This capability addresses significant cybersecurity risks, including unauthorized access, data exfiltration, and exposure to malicious activities such as advanced persistent threats (APTs) and botnets.

For example, suppose an internal application begins communicating with an external IP address not associated with any known vendor. The system identifies this anomaly and discovers that the IP address is linked to a command-and-control server used by a known botnet. This early detection allows the organization to isolate the compromised application and prevent further damage.

In another variant, the system enhances cybersecurity by integrating additional data sources such as domain and IP WHOIS databases, network registries, and threat intelligence feeds. This integration allows for the detection of anomalies in communication patterns, such as unexpected increases in data transfer volumes, deviations in communication frequency, or interactions with previously unknown entities. For example, if an internal server suddenly begins transferring large amounts of data to an external IP address that is not associated with any known third-party entity, the system can flag this behavior for immediate investigation.

As a specific scenario, a manufacturing company might observe one of its servers uploading substantial amounts of proprietary design data to an external domain. By cross-referencing with threat intelligence feeds, the system identifies the domain as associated with industrial espionage activities, prompting swift action to halt data exfiltration.

As described herein, the system also facilitates the updating of security policies and firewall rules by providing detailed insights into network interactions. By highlighting discrepancies between observed network traffic and existing security configurations, organizations can proactively adjust their security measures. For instance, if the system identifies that a demised third-party vendor's IP address is still receiving network traffic from the organization's infrastructure, it can recommend updating firewall rules to block such connections, thus reducing potential attack surfaces.

For example, a company may have terminated its contract with a cloud service provider but discovers through the system's analysis that some applications are still communicating with the provider's servers. The system alerts the IT team, which then updates the firewall settings to prevent any further unintended communication, closing a security gap.

Consider an example where a third-party vendor provides a vulnerability management platform deployed within the organization's environment. This platform may internally call external APIs from the vendor's servers or from additional sub-vendors to retrieve updates or perform analyses. These API calls may occur over various protocols such as HTTPS, utilizing underlying transport protocols like TCP/IP. The platform may also use encrypted connections employing TLS/SSL protocols to secure communications.

In a specific instance, the vulnerability management platform begins failing to receive updates due to network changes. The system analyzes the failed connections and, through fuzzy matching and WHOIS data, identifies that the API endpoint's IP address has changed and is now associated with a different entity. This prompts the organization to verify the legitimacy of the new endpoint before updating security policies to allow the connection.

Moreover, these external systems can initiate complex communication patterns involving multiple intermediary services or servers. They might utilize load balancers, content delivery networks (CDNs), and dynamic DNS services. Traffic may pass through various routers, switches, and firewalls, and may be subject to network address translation (NAT) or virtual private network (VPN) tunneling, which can obscure the originating source or destination of the traffic at the network layer.

For example, a global logistics company employs a third-party tracking service that uses CDNs to optimize performance. The dynamic nature of CDNs means that IP addresses and nodes change frequently. The system leverages machine learning models to adapt to these changes, ensuring that legitimate traffic is not mistakenly blocked while maintaining security.

Using the approaches described herein, the system processes network traffic data across different layers of the OSI model to handle such complexities. The fuzzy matching algorithms and machine learning models enable the system to normalize and analyze this data effectively, thereby identifying the underlying third-party entities responsible for network communications. This is particularly useful when third-party systems use dynamic IP addresses, operate behind proxy servers, or implement protocol encapsulation and tunneling.

In a concrete example, a retail organization finds it challenging to track communications with a marketing analytics service that frequently updates its infrastructure. By applying the proposed techniques, the organization can continuously map changing network identifiers back to the service provider, ensuring seamless operation and accurate monitoring.

From a user's perspective, network security analysts can leverage the system to gain a comprehensive understanding of network interactions with third-party entities. For example, the system can provide detailed records and reports that identify communication relationships between devices in the private network and external systems, associated with specific named third-party entities. This helps in monitoring authorized connections and identifying any unauthorized or suspicious activities.

As an illustration, a security analyst at a financial firm uses the system's dashboard to observe that certain internal workstations are communicating with unrecognized domains during off-hours. The analyst investigates and discovers that these are unauthorized connections potentially linked to malware, enabling prompt remediation.

As described in variations herein, the system supports proactive security measures by detecting anomalies such as unexpected communication patterns or connections to demised third-party entities. For instance, if the system detects that internal devices are attempting to connect to IP addresses associated with a former vendor whose access should have been terminated, it can flag these connections for further investigation or automatically adjust firewall rules to block them. This helps prevent unauthorized access and potential data breaches.

For example, an educational institution discontinued a partnership with an online learning platform but later notices continued data exchange with the platform's servers. The system identifies this anomaly, and the IT department updates network policies to terminate all residual communications, protecting student data.

The techniques proposed herein can also be used to detect network patterns that have no known associated or approved vendor. For example, communications with unknown external IP addresses may indicate unauthorized data exfiltration or command-and-control activities by malicious actors. By identifying these patterns, the system enables organizations to take immediate action to mitigate potential threats.

In a specific case, a government agency observes encrypted outbound traffic to an IP address in an unexpected geographic location. The system, unable to associate the IP address with any approved entity, raises an alert. Investigation reveals a compromised device attempting to send sensitive information abroad, allowing the agency to contain the threat swiftly.

Furthermore, the system's ability to process large volumes of network data efficiently and integrate with existing security infrastructure makes it a scalable and practical solution for modern enterprise environments. By continuously monitoring network traffic and updating security policies accordingly, organizations can effectively manage third-party risks and comply with regulatory requirements related to data security and privacy.

For example, a multinational corporation with vast network traffic implements the system to automate the analysis of billions of communication events daily. The system seamlessly integrates with their existing security tools, helping the organization maintain compliance with regulations like GDPR and CCPA by ensuring data is only shared with authorized third parties.

In another example, the techniques can be applied to support incident response teams during cybersecurity investigations. By providing a detailed mapping of network interactions and associated entities, the system assists analysts in tracing the origin of security incidents, understanding the scope of a breach, and identifying affected systems. This accelerates the incident response process and helps in minimizing the impact of security incidents.

For instance, after detecting unusual activity, a cybersecurity team uses the system to map the compromised server's communications over the past month. They identify unauthorized connections to a suspicious domain, helping them understand the breach's timeline and contain the affected areas promptly.

As described in earlier embodiments, the system enhances security measures by employing machine learning models that continuously learn from new data and feedback. This allows the system to adapt to evolving threat landscapes and improve the accuracy of entity identification over time. Organizations benefit from an adaptive security solution that stays effective against emerging threats and sophisticated attack vectors.

For example, an organization faces frequent phishing attempts where attackers use look-alike domain names. The system's machine learning models learn from each identified threat, improving its ability to detect and block future phishing domains even as attackers modify their tactics.

The examples described herein are non-limiting and illustrate various practical applications of the techniques proposed. By addressing the challenges of accurately identifying entities associated with third-party network traffic, the system provides significant benefits in enhancing cybersecurity, detecting anomalies, and supporting proactive security management in complex network environments.

FIG. 1 shows a network system in overview. The network system 100 includes a private network infrastructure 110, for example associated with an organisation, and a public network 130. Devices connected to the private network infrastructure can communicate with external systems, such as third-party systems 126 and 128, via the public network 130, e.g. the Internet.

Private network infrastructure 110 includes various devices, for example server devices 118 and client devices 120, along with network infrastructure devices such as routers 112, firewalls 114 and proxy servers 116. Note the various device types are shown by way of example and other types of devices may be connected to the network infrastructure.

Third party systems 126, 128 could include, for example, servers, client devices or other devices which may interact with devices in the private network infrastructure 110. The third-party systems may themselves be complex systems, including networks of multiple devices which may originate traffic to, or receive traffic from, the private network infrastructure 110. These external systems are typically under the control of different organisations (separate from the organisation operating private network infrastructure 110) and are thus referred to as "third-party" systems.

For example, devices at third-party systems 126 and 128 may communicate with application servers 118 in the private network infrastructure to access application services provided by the organisation. Similarly, clients 120 in the private network infrastructure 110 may access servers (e.g. hosting web or other application services) in third party systems 126, 128. Such interactions may involve traffic flowing via other components such as proxies (e.g. for efficiency) and firewalls (e.g. to secure communications between private network infrastructure 110 and public network 130). An analytics server 102 connected to the private network infrastructure 110 provides analysis functions for analysing various network traffic data obtained from the private network infrastructure 110 in order to identify communication relationships between devices in the private network infrastructure and the third-party systems.

For instance, a third-party vendor might provide a vulnerability management platform deployed within the organization's environment. This platform could internally call external APIs from the vendor's own servers or from additional sub-vendors to retrieve updates or perform analyses. These API calls may occur over application-layer protocols such as HTTPS (Layer 7), utilizing underlying transport protocols like TCP (Layer 4) and network protocols like IP (Layer 3). The platform may also use encrypted connections employing TLS/SSL protocols (Layers 5-6) to secure communications.

Moreover, these external systems can initiate complex communication patterns that involve multiple intermediary services or servers, making use of load balancers, content delivery networks (CDNs), and dynamic DNS services. Traffic may pass through various routers, switches, and firewalls, and may be subject to network address translation (NAT) or virtual private network (VPN) tunneling, which can obscure the originating source or destination of the traffic at the network layer (Layer 3).

Because these interactions can involve nested and indirect connections-such as a third-party application communicating with a sub-vendor's services without explicit awareness by the organization—it becomes challenging to accurately identify the underlying third-party entities responsible for the communications. At the application layer (Layer 7), the use of standardized protocols like RESTful APIs or SOAP, combined with the exchange of serialized data formats (e.g., JSON, XML), adds additional complexity in tracing the entity behind a communication session.

Additionally, variations in network identifiers pose significant challenges. For example, third-party systems may use dynamic IP addresses allocated via DHCP, or they may operate behind proxy servers, which means multiple entities share a common IP address. Domain names associated with third-party systems may have multiple aliases or may change over time due to rebranding or corporate restructuring. The use of IPv6 addresses introduces further complexity due to their extended format and representation.

Furthermore, advanced networking features like protocol encapsulation and tunneling (e.g., GRE tunnels, IPSec tunnels) can encapsulate higher-layer protocol data units within lower-layer protocols, masking the actual source and destination addresses from standard network monitoring tools. In such cases, analyzing packet payloads may be necessary to identify the true endpoints, which requires deep packet inspection (DPI) techniques and may be hindered by encryption.

All these factors contribute to the difficulty in determining the underlying third-party entity behind communications solely based on network traffic data.

The analytics server 102 has access to a set of databases 108 storing network traffic information and analysis results to support the analytics functions. A client device 104 (which may be an example of clients 120), can access the analytics server 102 to run analytics functions or view results of the analytics. For example, an analytics web application may be accessed using a browser 106 at the client device.

Also connected to the public network are one or more network registries 122 and 124. These comprise registry databases providing registration information for network identifiers, such as domains and network addresses or address ranges, and identifying registrant entities to whom domains or network addresses have been registered or assigned. In particular examples, the registries include a network registry for domain names that identifies owners of those domain names (also referred to as a Domain WHOIS registry), and an IP address registry that identifies owners of IP address ranges in the network (also referred to as an IP WHOIS registry). The analytics server 102 uses information from the network registries along with other information in databases 108 to identify named organisational entities associated with third party systems 126, 128. Additionally, the analytics server obtains traffic records, logs and the like from devices in the private network infrastructure 110 and uses these to identify network events involving (e.g. communication exchanges between) devices in the private network and third-party systems. The analytics server correlates information from these various sources in order to identify the named third party entities involved in these communication exchanges and other network events.

In particular, traffic records obtained from the network may typically only identify participants in communication exchanges through network identifiers, such as IP addresses or domain names. It is typically not immediately apparent from this information which entities own or use those network identifiers. Thus, the analytics server uses information from other sources such as the network registries to identify the likely third parties involved in communications and network events. This allows the system to identify the sources and destinations of traffic between the private network and external systems.

Figure 2:
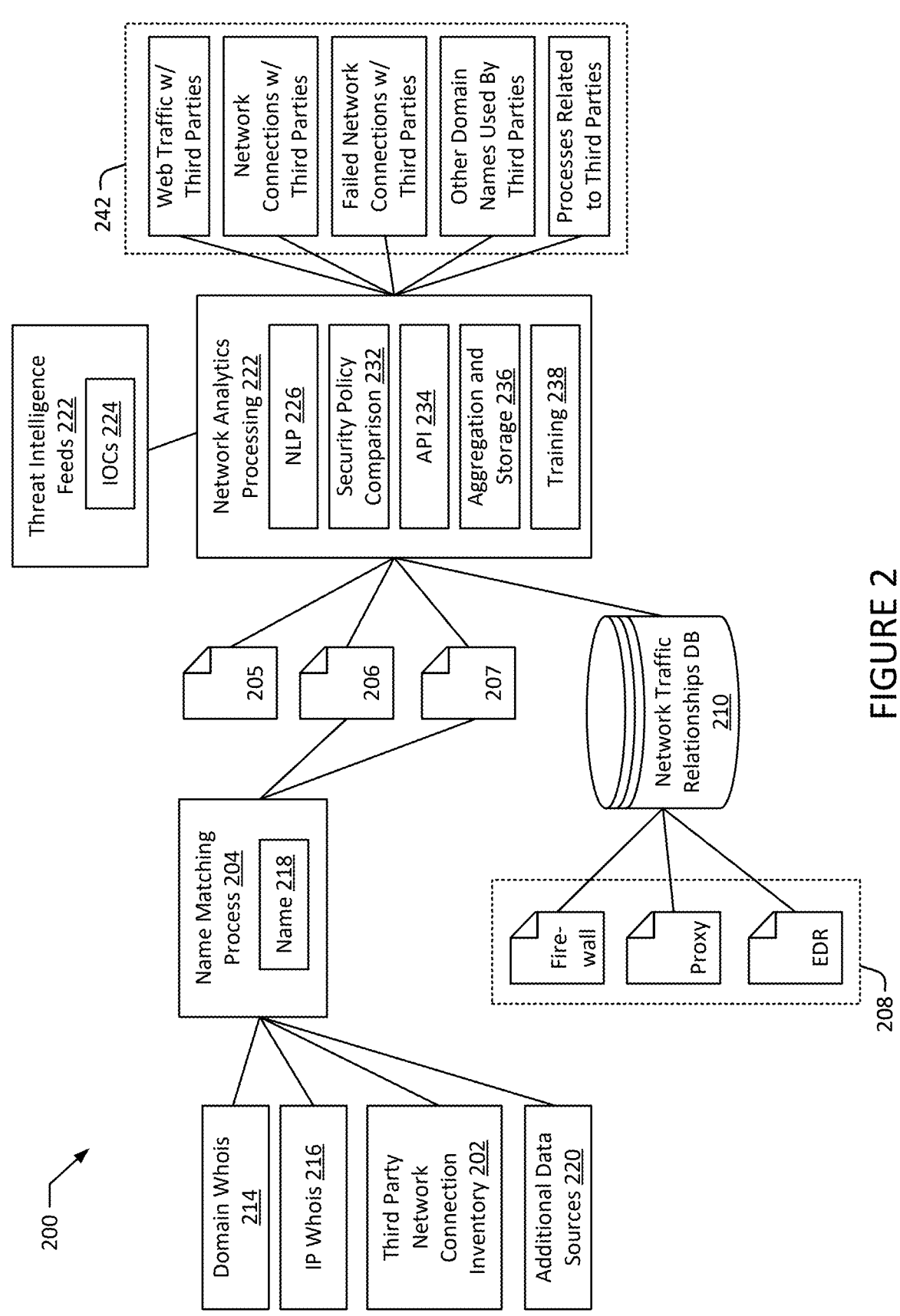
FIG. 2 illustrates data processing performed by the system according to one aspect of the present disclosure.

FIG. 2 illustrates the various information sources and processing stages in more detail. In this example, the network registries include a domain WHOIS database 112 and an IP WHOIS database 114. A third-party network connection inventory (TPNCI) database 202 (e.g. one of the databases 108 of FIG. 1) provides information on known interactions between the private network infrastructure and third party systems, providing identifying information for the third parties involved, in particular names of third party entities or organisations. For example, for a third-party entity having an agreement to access application services provided by servers in the private network infrastructure, information identifying the third party may be added to the TPNCI database.

The system applies a name matching process 204 to match names between the network registries and the third-party network connection inventory 202 in order to identify IP address ranges and domain names associated with particular named organisational entities. In this process, the entity names from the third-party network connection inventory 202 may be used as the definitive names for the third-party entities. This results in a set of domain names and IP address ranges (net blocks) associated with named entities. These may also referred to herein as network identifier mappings-domain name mappings 206 provide mappings between domain names and entity names, whilst IP address mappings 207 provide mappings between IP address ranges and entity names. The domains and address ranges may be stored with the associated third-party names as obtained from the third-party network connection inventory 202.

Traffic records 208 may include firewall logs, proxy logs, EDR (endpoint detection and response) logs, and other device logs and records. EDR logs may include detailed information about activities on endpoints within the network infrastructure, such as process executions, network connections initiated by processes, and security events detected at the endpoint level. These logs may include records of DNS lookups performed by specific processes on the endpoints, linking application-level activities to network events. As further examples, traffic records may also include DNS lookup logs (e.g., from a DNS server) and DNS records obtained from a DNS database.

These traffic records are processed (such as by the analytics server 102) to generate a network traffic relationships database 210. This database 210 stores detailed communication relationships identified in the network involving particular network identifiers, such as specific IP addresses, domain names, hostnames, and process identifiers. Communication relationships may include successful or unsuccessful connections or data transmissions between a source IP address and a destination IP address, detected from firewall logs. This includes information such as the connection status (allowed or blocked), ports used, protocols (TCP/UDP), timestamps, and the amount of data transferred. Communication relationships may also include DNS lookup attempts by a particular IP address or hostname for a particular domain name, obtained from DNS logs, indicating which hosts are attempting to resolve certain domain names and potentially revealing intended communication targets. DNS records identifying a domain name and an associated IP address, obtained from DNS servers or external DNS databases, may be used to map domain names to IP addresses observed in network traffic, providing a link between human-readable domain names and machine-level IP addresses. DNS lookups performed by a particular process identifier (PID) or process name on a host for a particular domain, obtained from endpoint detection and response (EDR) logs, may be used to link network activity to specific applications or services running on endpoints, allowing for granular analysis of process-level communications.

These communication relationships work together to inform the fuzzy matching process by providing a comprehensive set of data points that can be correlated with entity identifiers. Specifically, the analytics server 102 may be configured to use these relationships to identify which internal hosts or processes are communicating with external network identifiers, map observed network identifiers (e.g., IP addresses, domain names) to potential third-party entities using the domain and IP address mappings 206, 207, enhance the accuracy of entity association by corroborating information across multiple types of communication events, or a combination thereof. This multi-faceted approach may allow the analytics server 102 to detect patterns, anomalies, and potential security risks that may not be apparent when analyzing a single type of network event. For instance, if a process on a host is performing DNS lookups for domains that are not associated with any known third-party entity, these lookups may indicate malicious activity or unauthorized software.

The data items identified with labels (1) and (2) in the above examples are represented by network identifiers (such as IP addresses, domain names, process identifiers etc.) found in the traffic records and these network identifiers are added to the communication relationship records in the traffic relationship database to specify the participants (or affected entities) of a communication relationship. In typical examples, a communication relationship includes two such network identifiers (for example corresponding to a source and destination of a communication exchange or an originator and subject of a lookup or query), at least one of which usually identifies an external network entity such as a device in an external third-party system 126/128. However, relationships could be specified by a single network identifier (e.g. identifying an external network entity involved in a communication event affecting (or detected in) the private network infrastructure 110), or more than two network identifiers.

A network analytics processing module 212 integrates information from the domain and IP address mappings 206, 207 with the network traffic relationships 210 to generate detailed communication relationship information that is associated with specific third-party entity names. This integration involves correlating network identifiers found in the traffic relationships with the entity identifiers in the mappings. The processing module 212 can extract network identifiers involved in each communication relationship, such as source IP addresses, destination IP addresses, domain names, and process identifiers and can then use the domain and IP address mappings 206, 207 to associate these network identifiers with entity identifiers by applying a fuzzy matching process, as described further below. Once associations are established, the module 212 can then supplement the communication relationship records by annotating the communication relationship records with the corresponding entity names, confidence scores from the fuzzy matching process, relevant metadata (such as connection statuses and data transfer metrics), and the like. The enriched records can then be aggregated and organized based on specific criteria, such as entity names, communication types, time periods, or risk levels, allowing for efficient querying and analysis of the data.

This information may be further augmented using an asset inventory 205 providing information on assets (devices such as routers, servers, etc.) in the private network infrastructure. Examples of output information 242 generated by the analytics module 212 may include detailed records and reports that provide actionable insights into network interactions with third parties. The output information 242 may include fields such as entity name, communication type, source identifier, destination identifier, timestamp, data transfer metrics, connection status, and confidence score. For instance, the system might detect that an internal application server with source identifier 192.168.1.20 has been making HTTPS requests to the domain "api.paymentprocessor.com" (destination identifier). The domain is associated with "SecurePay Inc." through the domain name mappings 206 with a confidence score of 0.94. The output information 242 would accordingly include the entity name "SecurePay Inc.," communication type "Web Traffic (HTTPS)," source identifier "192.168.1.20," destination identifier "api.paymentprocessor.com," timestamp "2024 Nov. 23 10:00:00," data transfer metrics indicating that 500 KB were sent and 1 MB received, connection status "Successful," confidence score 0.98, or a combination thereof.

In another example, the system may identify failed connection attempts from an internal client with source identifier 192.168.1.50 to an external IP address 198.51.100.25 associated with a demised third-party vendor "OldTech Solutions," which should no longer be accessed. The output information 242 would accordingly include the entity name "OldTech Solutions," communication type "Failed Network Connection," source identifier "192.168.1.50," destination identifier "198.51.100.25," timestamp "2024 Nov. 23 09:45:00," data transfer metrics indicating zero bytes sent and received, connection status "Blocked by Firewall (Rule ID: FW1234)," confidence score 0.95, or a combination thereof.

The various processing operations may be performed by the analytics server 102 of FIG. 1.

Figure 3:
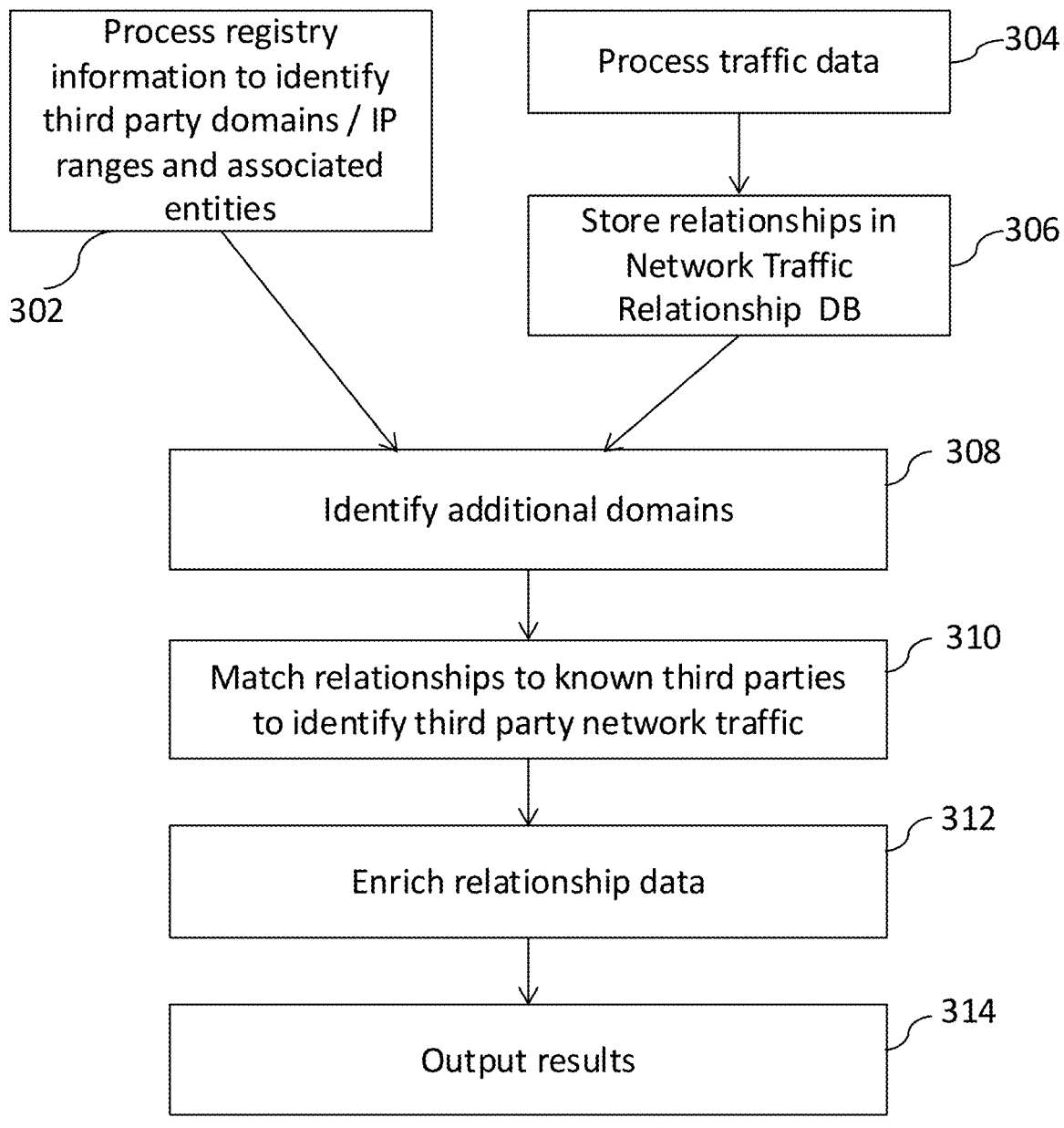
FIG. 3 illustrates a data processing method for identifying named entities associated with network interactions according to one aspect of the present disclosure.

FIG. 3 illustrates processing steps performed by the system in overview. The various steps will be described in more detail below.

In step 302, the system obtains information on domains and IP ranges registered to various third parties from the network registries (112, 114) and associates the information with named entities using a fuzzy matching approach to match against information in the third-party network connection inventory 202. This results in the domain and IP address mappings 206, 207 which map domain names and IP addresses to third party entities.

In step 304, the system processes traffic records 208 to identify communication relationships. In step 306, the system stores information on the identified relationships in network traffic relationship database 210. Step 302 may proceed independently from steps 304 and 306 (e.g. in parallel).

In step 308, the system may identify additional domains related to third parties using information from the network registries.

In step 310, the analytics server 102 matches communication relationships from the network traffic relationships database 210 to known third parties identified from the third-party network connection inventory 202 and network registries 214, 216 using the mappings 206, 207 in order to identify network traffic and events associated with specific named third-party entities.

To perform the matching, the analytics server 102 may retrieve communication relationships associated with specific network identifiers, such as IP addresses and domain names, from the database 210 and use the domain name mappings (206) and IP address mappings 207 to attempt to match these network identifiers to entity identifiers from the third-party network connection inventory 202. The matching may involve exact string comparisons for network identifiers that directly correspond to known entities. Additionally or alternatively, a fuzzy matching process may be used to perform the matching, such as to account for variations in naming conventions, misspellings, discrepancies between network identifiers and entity records, and the like. The fuzzy matching process is described in further detail herein. In cases where multiple potential matches are found, the analytics server 102 may assign confidence scores to each association, such as based on the comparisons, the fuzzy matching process, or a combination thereof. The analytics server 102 may select associations exceeding a predefined confidence threshold, may select associations with the highest confidence score, or a combination thereof. For associations confidence scores below a predefined confidence threshold may be stored (such as in association with multiple potential entity identifiers) for further processing, such as further automated processing, further analysis by security personnel, or a combination thereof. The matching may also be performed based on context information for the communication relationships, such as the frequency of interactions, the types of network events, and historical communication patterns, which may enhance the accuracy of the associations. For example, if an internal host frequently communicates with a particular external IP address, and that address is associated—even with low confidence—with a known third-party entity, the system may give higher priority to that association.

The resulting relationship data may be further processed in step 312, which may include enriching the relationship data using additional data sources and/or aggregating the data. In step 314, the system outputs the results of the analysis. For example, the system may generate stored output reports or may present output reports to a user via a suitable interface.

Identification of Third-Party Domains and IP Address Ranges

Figure 4:
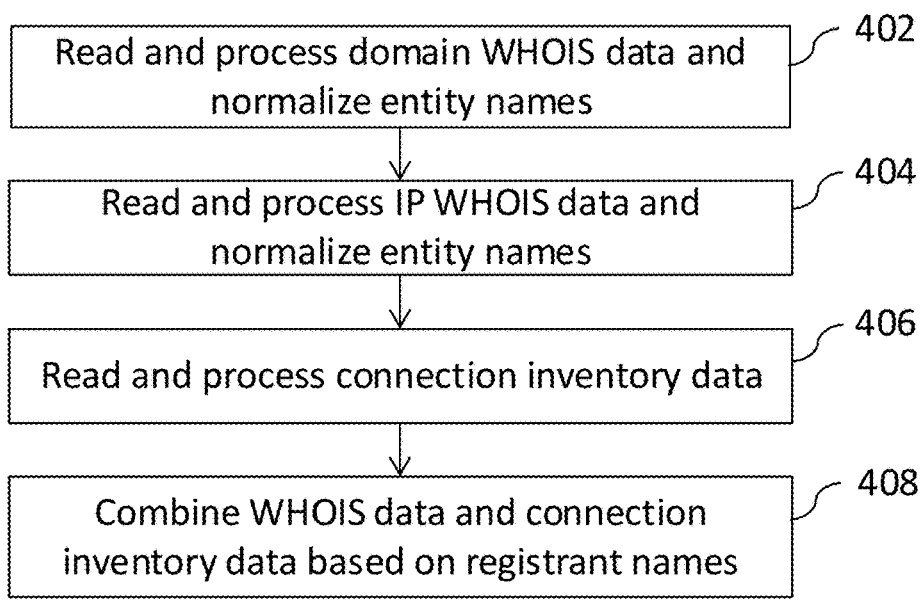
FIG. 4 illustrates a method for processing network registry information according to one aspect of the present disclosure.

The identification of third-party domains and IP address ranges (step 302) is illustrated in more detail in FIG. 4.

In a first stage, registration data is obtained from the network registries and processed. Specifically, in step 402, the system obtains Domain Whois data from Domain Whois database 112. The domain Whois data includes domain names, and registrant information identifying entities having registered the domain names, such as registrant entity name, address, and the like. An example of the domain Whois data that is obtained is shown in FIG. 7C. The data is enriched by generating a normalized version of the registrant name. The normalization process is described in more detail below.

Similarly, in step 404, IP Whois data is obtained from IP Whois database 114. This includes information defining IP address ranges and registrant information identifying entities having registered those IP addresses (i.e. to whom those IP address ranges have been assigned), such as registrant entity name, address, and the like. FIG. 7D shows an example of the IP registry data that maybe obtained. The data is again enriched with a normalized version of the registrant name.

In step 406, the system reads connection inventory data from the third-party network connection inventory 202, specifying names of third-party entities for a set of known interactions between the private network infrastructure and external organisations, networks and systems. For example, this may be based on service agreements with external organisations. The connection inventory data may include other data relating to known interactions, such as a status of the interaction (see FIG. 7B). The data is also enriched with a normalized version of the name.

In step 408, the Domain and IP Whois data is joined with the connection inventory information using fuzzy matching against their normalized names. In particular implementations, the normalized registrant names from the domain Whois information are joined with the normalized names from the connection inventory information using fuzzy matching. This may output domains with high likelihood of being associated with known third parties. In additional or alternative implementations, the normalized registrant names from the IP Whois information are joined with the normalized names from the connection inventory information using fuzzy matching. This may output IP network address ranges with high likelihood of being associated with known third parties.

The fuzzy matching process is described in more detail below.

This stage results in a set of records defining network identifier mappings that map known third-party entity names to associated domain names and/or IP address ranges. These are the domain name and IP address mappings 206, 207 of FIG. 2. Other information from the WHOIS databases and/or TPNCI database may also be added to these mappings.

In an embodiment, the connection inventory information identifies names of entities involved in known connections between external organisations and the private network infrastructure along with a connection status. The connection status could, for example, be "active" for current active connections, for example where a third party has an agreement to access services provided by systems in the private network infrastructure 110, or "demised" for connections that existed at a time but are no longer active, for example because an agreement to provide a service to a third party has ended. In certain aspects, the system may handle "active" and "demised" connections differently to maintain appropriate security postures. For "active" connections, the network identifiers associated with the third-party entities may be permitted and monitored for expected communication patterns. For "demised" connections, the system may flag any continued network activity associated with these entities as potential security risks, since such connections should no longer have access. Information regarding connection statuses may be added to the mappings, such that a mapping of a particular IP address range or domain name to a named entity identified from the third-party connection inventory also identifies the relevant connection status. Accordingly, the status of "active" or "demised" connections may also be used to determine subsequent actions, such as generating alerts, recommending firewall rule updates to block demised entities, isolating suspicious network traffic, and the like, as discussed further herein.

Where domain or IP registry information cannot be matched against a known third-party entity recorded in the third-party connection inventory 202, network identifier mappings may still be created using the normalized registrant names obtained from the registry records. These mappings may be flagged as "unknown" or assigned a lower confidence level, since they define network identifiers associated with third-party entities not specifically known to the operator of the private network infrastructure 110. Furthermore, the system may categorize these mappings into different levels of confidence or certainty, such as "known," "probable," "possible," and "unknown," based on the fuzzy matching results and confidence scores. Such classification may allow the system to handle entities and connections that are not conclusively identified but are potentially associated with certain third parties. For example, connections with "probable" entities may be monitored more closely, while those with "unknown" entities may trigger alerts for immediate investigation.

These mappings can nevertheless be used in the same way to associate named entities with traffic records, with the system adjusting its actions based on the confidence levels. Conversely, mappings derived from registry records that can be matched to the third-party connection inventory may be labeled as "known" connections to distinguish them from mappings derived solely from registry data.

In some implementations, only "known" and "probable" connections may be used to derive network identifier mappings, with network registry records that cannot be confidently matched to known connections identified in the third-party connection inventory being assigned a status indicating the need for further analysis. In other implementations, the system may employ machine learning models to continuously refine these mappings based on new data and feedback, allowing it to gradually improve the accuracy of entity identification over time. For example, the machine learning models may incorporate techniques such as semi-supervised learning, where the model learns from a combination of labeled ("known" and "probable") and unlabeled ("unknown") data to enhance its predictive capabilities on uncertain mappings. Additionally, the system may utilize active learning strategies, where it selectively queries human analysts to label the most informative data points, thereby efficiently improving the model's performance. The mappings may also be stored with version control and metadata tracking, enabling the system to analyze historical changes, assess the impact of updates, and adjust its confidence thresholds dynamically based on observed trends and feedback.

Network Traffic Relationship Database Ingest

Figure 5:
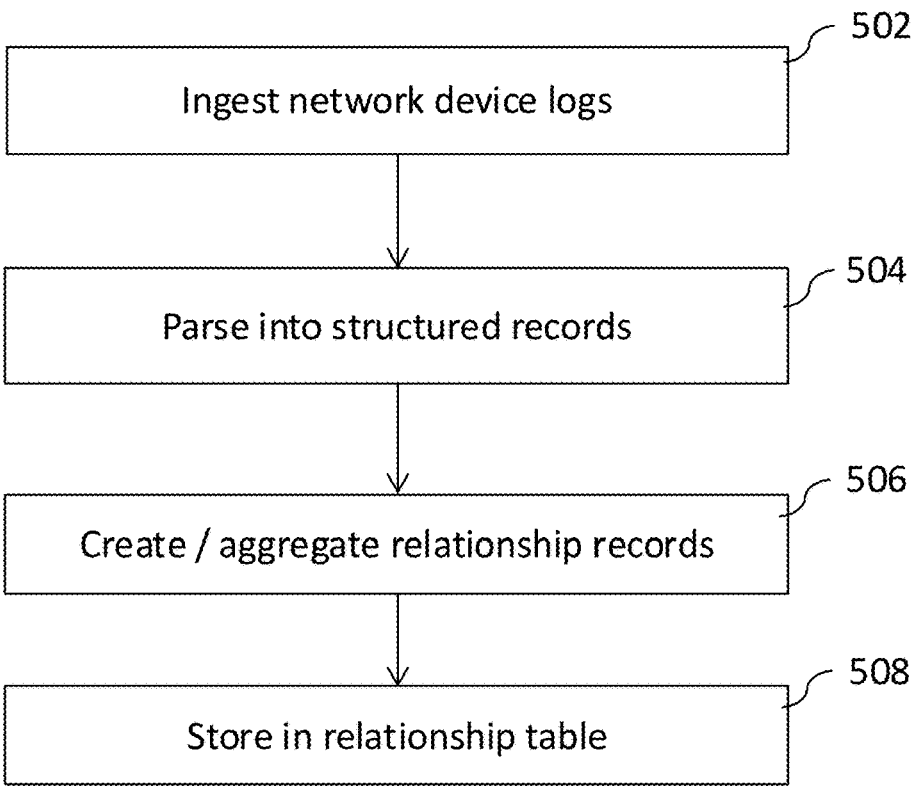
FIG. 5 illustrates a process for identifying network relationships from traffic data according to one aspect of the present disclosure.

FIG. 5 illustrates processing performed by the system to ingest data from the traffic records into the network traffic relationship database 210 (corresponding to steps 304-306 of FIG. 3).

In step 502, traffic records in the form of network device logs are ingested from their various sources (e.g. firewalls, proxies and other network devices). The logs are parsed into structured records defining network events extracted from the logs in step 504. Network events may include communication events such as data transmissions, requests/responses, firewall actions etc.

Communication relationship records are generated in the traffic relationship database from these network events in step 506.

Reference is made to FIG. 7A, which illustrates by way of example various relationship types detected by the system and how they can be represented as structured relationship records. Each type of relationship is identified by a relationship type or name, a key and value. For example, the key and value may identify sources and destinations for communication events by way of network identifiers. Sources and destinations may, for example, be identified by domain or IP addresses. The network identifiers may also specify an originator and subject of a lookup as the "source" and "destination" of an event (e.g. DNS lookup). FIG. 7A provides a brief summary of each relationship type. However, the table is not exhaustive and many other types of communication relationships or communication events that can be identified from various types of logs and other network monitoring data sources can be used. For example, alternative implementations may include capturing process-level activities where a specific process on a host initiates a network connection to an external entity. In such instances, a record for a relationship may include a process identifier (PID), process name, host IP address, destination IP address or domain name, timestamps, the type of connection established, or combinations thereof.

As explained further below, establishing relationships may include collecting and correlating data from various logs and sources and structuring the relationship records in formats that facilitate efficient traversal and matching. For instance, the records may be stored in a graph database where nodes represent network entities or processes, and edges represent the relationships or communication events.

These structured relationship records may be designed to support the fuzzy matching process by organizing data in a way that allows for rapid querying and comparison. The records include normalized network identifiers to facilitate matching despite imperfections in the data. They also incorporate metadata such as timestamps, connection statuses, and confidence scores. Indexes and caches may be used to optimize performance for frequent queries.

For example, when the system encounters a network event where a host with IP address 192.168.1.10 connects to a domain "examplecorp.com," it creates a structured relationship record capturing this event. The system then uses the domain name mappings (206) to associate "example-corp.com" with potential entity identifiers, applying fuzzy matching if necessary. The structured format of the relationship records allows the system to efficiently traverse from the network event to the associated entity, even when dealing with large volumes of data.

Sources may include, for example, firewall logs, web proxy logs and endpoint detection and response logs. In certain implementations, firewall logs are parsed into structured records. For instance, pairs of fields are extracted and form key-value pairs that represent key relationships of communication, i.e. the source IP address (src_ip) and destination IP address (dst_ip) that are identified in a firewall log entry form a src_dst_connection relationship. In certain implementations, web proxy logs are parsed into structured records. For instance, pairs of fields are extracted and form key-value pairs that represent key relationships of communication, i.e. source IP address (src_ip) and destination domain name (domain) form a src_domain_connection relationship. In certain implementations, endpoint detection and response logs are parsed into structured records. Pairs of fields are extracted and form key-value pairs that represent key relationships of communication, i.e. src_ip and dst_ip, src_ip and destination domain name.

Timestamps are associated with each relationship extracted from the log sources. Depending on the source, the system may record additional traffic metrics with identified relationships, such as event counts and/or data volumes (e.g. bytes sent/received) in the relationship records.

Furthermore, depending on the source the system may further distinguish different types of relationships based on the logs. In the case of firewall logs, the system may identify not only source and destination IP addresses but also the action taken by the firewall (e.g. permit/deny) and thus distinguish between successful and blocked connection attempts. These are then recorded as separate relationship types in the relationship table (see. e.g., Src_dest_connection and Sec_dest_blocked as examples of communications allowed or blocked by the firewall). Alternatively this could be recorded as an additional attribute of the relationship.

An entry is created in a relationship table of the Network Traffic Relationship Database 210 for each identified relationship, specifying the relationship name or type, and the key and value information appropriate to that relationship type, specifying network identifiers of one or more network entities involved in the relationship. Each relationship record includes specific fields that detail the nature of the communication event. For example, a relationship record can contain the relationship name or type, such as "src_dst_connection" for source-to-destination connections, "src_domain_connection" for source-to-domain communications, or "process_domain_lookup" for processes performing domain lookups. The relationship record can include a key, which is the network identifier of the originator of the communication event, such as an IP address (e.g., "192.168.1.10"), a hostname, a combination of a process identifier and host (e.g., "Process ID 1234 on Host 192.168.1.10"), and the like. The value may also represent a network identifier of the target of the communication, which could be an IP address, a domain name (e.g., "api.examplecorp.com"), and the like.

Furthermore, each record may include a timestamp indicating when the communication event occurred, and additional attributes such as the protocol used (e.g., TCP, UDP), ports involved (e.g., port 443 for HTTPS), connection status (e.g., successful, failed, blocked), data transfer metrics (e.g., bytes sent and received), other associated process information, or combinations thereof. Continuing with the example above, suppose an internal host with IP address "192.168.1.10" initiates an HTTPS connection to the domain "api.examplecorp.com" at timestamp "2024 Nov. 23 10:00:00". The relationship record created could specify the relationship name/type as "src_domain_connection", the key (source identifier) as "192.168.1.10", the value (destination identifier) as "api.examplecorp.com", the timestamp as "2024 Nov. 23 10:00:00", and additional attributes such as protocol "HTTPS", port "443", connection status "Successful", data sent "500 KB", and data received "1 MB".

If a process on the same host, identified by Process ID 1234 and named "PaymentProcessor", performs a DNS lookup for "payments.examplecorp.com" at timestamp "2024 Nov. 23 09:58:00", another relationship record could be created. This record would specify the relationship name/type as "process_domain_lookup", the key (source identifier) as "Process ID 1234 on Host 192.168.1.10", the value (destination identifier) as "payments.examplecorp.com", the timestamp as "2024 Nov. 23 09:58:00", and additional attributes such as lookup result "Success" and resolved IP "203.0.113.5".

The system may aggregate relationships by key, value, and relationship type. Aggregation involves combining multiple relationship records that share common attributes into summarized entries to reduce data volume and enhance analysis efficiency. Aggregation reduces the number of records stored, making data management more efficient and enabling faster query responses. Aggregation may accordingly allow the system to identify trends and patterns over time, such as peak communication periods, frequent communication partners, or unusual spikes in data transfer volumes, without undue computational resource utilization. Additionally aggregated data may support higher-level analyses, such as anomaly detection, bandwidth usage monitoring, and capacity planning.

Aggregation may also be performed by timestamp, grouping events occurring within particular time windows, such as minutes, hours, or days. At the field level, aggregation may be performed by grouping relationship records based on the combination of the relationship name/type, key (source identifier), and value (destination identifier). Within each group, the system calculates aggregate metrics, such as the event count—the total number of communication events that occurred between the specific source and destination within the aggregation period. It also calculates the total data sent and received across all events in the group, counts of different connection statuses (e.g., number of successful connections, number of blocked attempts), and the time window indicating the range of timestamps for the aggregated events.

For example, if over the course of one hour, the internal host "192.168.1.10" established 50 successful HTTPS connections to "api.examplecorp.com", the aggregated relationship record could specify the relationship name/type as "src_domain_connection", the key (source identifier) as "192.168.1.10", the value (destination identifier) as "api.examplecorp.com", the event count as 50, total data sent as 25 MB, total data received as 50 MB, connection status summary indicating 50 successful connections, and the time window from "2024 Nov. 23 10:00:00" to "2024 Nov. 23 11:00:00".

Thus, when the system encounters a relationship of a particular type between a particular source and destination that has been previously recorded in the database, the new record may be aggregated with the existing record. This means that the system can update the existing aggregated relationship record rather than creating a separate entry. The aggregation process can include incrementing the event count for the relationship and updating cumulative metrics, such as the total bytes sent or received. For a new relationship, such as a traffic event between a source and destination of a particular type not seen before, a new relationship record is created and added to the database.

The resulting aggregated relationship records are stored in a scalable table designed for efficient lookup by key and relationship type. Lookup, in this context, may include querying the aggregated data to retrieve information about specific communication relationships based on certain criteria. The lookup process may be performed using database indexing and query optimization techniques to ensure rapid access to the data. The lookup can be exact or fuzzy. In an exact lookup, the system may search for records that precisely match query parameters, such as an exact IP address and domain name. This is suitable when the identifiers are known and accurately recorded. In a fuzzy lookup, when there may be variations or uncertainties in the identifiers due to typos or alternate naming conventions, the system employs fuzzy matching processes similar to those described herein to retrieve records that closely match the query criteria. This involves computing similarity scores between the query input and the stored identifiers and retrieving records that meet a predefined confidence threshold.

The output of the lookup is a set of aggregated relationship records that satisfy the query conditions. In the case of a fuzzy lookup, each returned record may be accompanied by a confidence score indicating the degree of match. This allows users or downstream systems to assess the reliability of the retrieved information, as described elsewhere herein.

The lookup functionality may be used for tasks such as investigating security incidents, auditing network activity, and generating reports on third-party communications. For example, if an analyst is investigating unusual activity involving communications with domains similar to "examplecorp.com", but the exact domain names are uncertain, they can perform a fuzzy lookup using the approximate name. The system would return aggregated records involving domains like "examplecorp.com", "examplecorp.com", or "example-corp.com", along with confidence scores. This enables the analyst to identify potential typosquatting or malicious domain spoofing activities.

This processing therefore results in a set of aggregated relationships of given types between given sources and destinations, with associated aggregated metrics (e.g. traffic flows between source IP address A and destination address B with a total byte count of C). The resulting aggregated relationship data may be stored in a relationship table 508. In certain aspects, the relationship table (508) is a structured data repository that holds aggregated relationship records. Each record in the table includes fields such as Source Identifier (e.g., an originator of the communication), Destination Identifier (e.g., a recipient of the communication), Relationship Type (e.g., a type of network interaction), Aggregated Metrics (e.g., event counts, total data sent/received, connection status summaries, and the like), Time Window (e.g., the period over which the data has been aggregated, Additional Attributes (e.g., protocols used, ports, confidence scores, and the like), or combinations thereof. The relationship table may be implemented using database systems that support large-scale data operations, such as columnar storage or distributed databases. Indexing on key fields may allow for rapid querying and retrieval of records based on various criteria.

In some implementations, the network traffic relationship database may be in the form of a graph database. The graph database may be created to model the complex network of communications in a way that reflects the interconnected nature of network entities. Nodes represent the various entities involved (e.g., hosts, IP addresses, domain names, processes), and edges represent the relationships or interactions between them. For example, the graph database may indicate communication relationships connecting nodes (identified by network identifiers such as IP addresses or domain names) with graph edges (representing communication types such as a successful or unsuccessful data connections/transmissions, a DNS lookup, a DNS response etc. and storing associated properties such as aggregated data). Properties stored on nodes and edges may include the aggregated metrics from communication events, timestamps, protocols, and confidence scores from the fuzzy matching process. Such a structure of the graph database may allow for efficient traversal using graph algorithms. For example, the system can quickly identify all direct and indirect connections to a particular node, detect communities or clusters of nodes that frequently interact, and find shortest paths between entities. This may be particularly useful for identifying potential lateral movement within a network during a security incident.

Identification of Other Domains Used by Known Third Parties

Returning to FIG. 3, the system may also identify (in step 308) additional domains used by known third parties, in addition to those identified directly from the domain registry 112. In an implementation, these are found by using the IP address ranges and associated entity names obtained based on the IP registry 114 in step 302. This information is used to seed queries against communication relationships found in the relationship discovery process described above between IP addresses and domain names (e.g. relationships of type "ip_domain" obtained from DNS records).

For example, for a given IP range $IP_x$-$IP_y$ mapped to a named entity E, the system queries the traffic relationship database to identify communication relationships of type "ip_domain" having an IP address within range $IP_x$-$IP_y$, and retrieves any associated domain(s) $D_1$ . . . $D_n$. Those domains are then linked to entity E as additional domains (in addition to those directly identified from the domain WHOIS data), resulting in additional domain mappings 206.

In a more complex example, the system might incorporate Autonomous System Numbers (ASNs), subnet masks, or CIDR notations associated with the entity E to broaden the scope of the search. It might also use previously identified domain names to find related domains through common registrant information or similar naming patterns. By performing reverse lookups and analyzing DNS records, the system can identify additional domains (D1 . . . $D_n$) that resolve to the IP addresses within the known ranges. These domains are then linked to entity E as additional domains, enriching the domain mappings 206.

This process allows the system to discover domains observed in network traffic that relate to the IP space of the known third-party entity. This can often reveal previously unknown domains and subdomains related to the third-party, including those that are dynamically generated or utilized for specific campaigns or purposes.

The additional domains are associated with the normalized entity names of the entities identified from the IP registry.

Identification of Third Party Network Traffic

Figure 6:
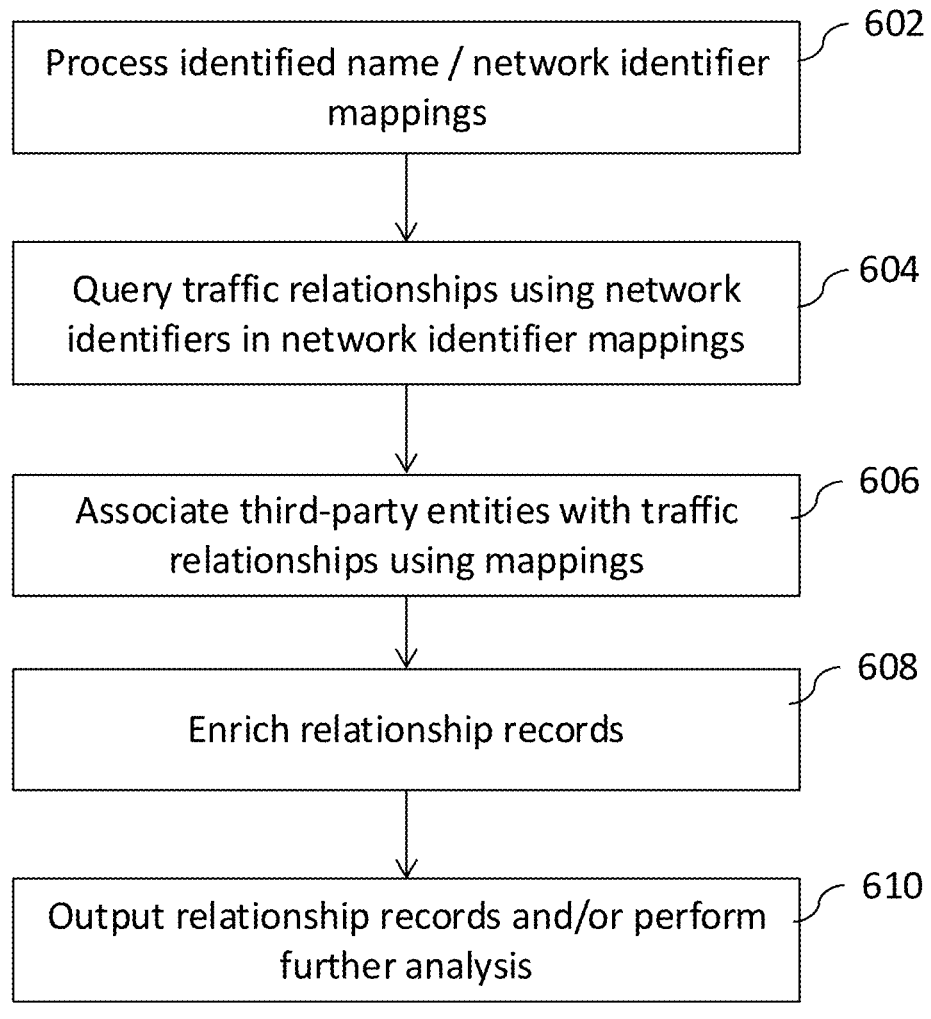
FIG. 6 illustrates a process for identifying named entities associated with identified network relationships according to one aspect of the present disclosure.

With reference to FIG. 3, once the relevant data including communication relationship information and domain and IP range mappings have been identified, the system proceeds in step 310 to identify third party network traffic for specific named third-party entities by matching communication relationships to known third parties. This process is illustrated further with reference to FIG. 6.

As described in relation to FIG. 3, the outputs from the identification of third-party domains and IP ranges (and identification of other domains used by known third parties) in steps 302/308 provide a set of network identifier mappings between named entities (specifically the normalised entity names) and network identifiers, such as particular domain names and IP address ranges associated with those entities. These mappings (e.g. mappings 206, 207 of FIG. 2) are accessed in step 602 and used in step 604 to seed queries of identified third party domains and IP blocks against the network traffic relationship database 210.

For example, the system selects a domain mapping from the network identifier mappings that associates a particular domain name with particular named entity and searches the communication relationship table for communication relationships including that domain name. Those communication relationships are then tagged in the database (step 606) with the normalized entity name specified by the domain mapping for that domain name.

Similarly, the system selects an IP address mapping from the network identifier mappings that associated a particular IP address range with a particular named entity and queries the communication relationship table for communication relationships including IP addresses within that IP address range. For example, if an IP address range $IP_x$-$IP_y$ is associated with a named entity $E_1$ by a mapping, the system generates a query to identify any communication relationships that include an IP address within range $IP_x$-$IP_y$ in the communication relationship table. Those relationships are then tagged with the named entity $E_1$ specified for that address range by the mapping.

The above steps are performed for each of the identified address and domain mappings. This results in records of communication relationships between internal hosts of the network infrastructure and external third-party hosts/devices, associated with the normalized names of the external third-party entities linked to those external hosts/devices. In this way, the system is thus able to map observed network traffic events from traffic logs to specific named organisational entities involved in or responsible for those network traffic events.

In certain instances, the system may also captures communication relationships between two or more internal hosts (e.g., that are not associated with a third-party system or entity). In such instances, the internal communications may be filtered or otherwise excluded from the presently-described analysis. For example, the analytics server 102 may identify network identifiers belonging to an internal network (such as using the asset inventory 205) and exclude communication events where both source and destination correspond to internal hosts.

Present examples refer to relationships being tagged with (normalized) entity names based on the mappings. Instead of using the entity name itself, the system may associate other types of unique entity identifiers (e.g. sequence numbers or other alphanumeric ID values) with entities. For example, the system may store a table associating entity identifiers with normalized entity names and use these identifiers in the network identifier mappings and/or communication relationship records. The term "entity identifier" or similar as used herein may thus refer to any identifying information used to identify a particular organisational entity, and this could be a name, normalised name, or any other form of identifier.

Once the traffic relationships have been tagged with the relevant named third party entities, the relationship data can be further enriched in step 608.

In one example, the connection status (e.g. "Active" or "Demised") identified in a mapping (and obtained as described above from the third party connection inventory) is added to any traffic relationship record tagged based on the mapping. Thus, where a traffic relationship record is tagged with a particular named entity that was found in the network connection inventory, the traffic relationship record will accordingly be labelled as associated with an "Active" or "Demised" known connection.

The system may also identify information relating to any communication endpoints within the private network infrastructure 110 associated with communication relationship records and associate this information with the communication relationships.

In one example, such information may include internal departments/lines of business (LOBs) or other organisational units or subnetworks associated with communication endpoints in the private network infrastructure. In one implementation, this involves enriching all communication relationship records with asset ownership information from internal asset databases 205. These are tables indexed by hostname or IP address which provide ownership details such as the responsible LOB, department, geographic region, etc. By adding this information to communication relationships, the system is thus able to distinguish traffic between a given named third party and various organisational divisions of the private network infrastructure.

The system can further be used to identify executed processes related to named third-party entities. For example, processes that performed DNS lookups of domains may be identified. To do this, the domain names obtained from steps 302/308 are used to seed queries against the Network Traffic Relationship Database (210) to obtain domain_process relationships with the same domain as identified. The domain_process relationships identify processes that performed DNS lookups of specified domains and may be found by analyzing logs from endpoint detection and response (EDR) systems or similar monitoring tools that record process-level network activities on hosts within the network infrastructure (110). This process may include correlating the domain names with process identifiers (PIDs) and process names, allowing the system to link network activities to specific applications or services running on endpoints.

In step 610, the entity-tagged and (where applicable) enriched traffic relationships can be output to the user and/or further processed and analyzed. The traffic relationship types recorded in the network traffic relationships database can be used to distinguish the types of traffic. For example, src_dst_connection and dst_src_connection represent source IP addresses that succeeded in communications with destination IP addresses; src_dst_blocked and dst_src_blocked represent source IP addresses that attempted communications with destination IP addresses but were blocked; and src_domain and domain_src represent host IPs that performed DNS lookups of domains.

The system can also use the aggregated statistics for communication relationships, such as event counts, bytes sent, and bytes received data to quantify traffic volumes by events, and bytes sent/received. In an implementation, the tagged communication relationship data can be queried to determine aggregated statistics for a particular named entity by aggregating communication relationship statistics over multiple communication relationships involving a particular entity name, for example to determine the total traffic flow volume between different hosts of a particular named third-party entity and the private network infrastructure (in either direction).

As a further example, the traffic records in the traffic relationship database 210 can also be run through a beacon detection process to identify traffic likely to be generated by a bot (i.e. an automated process, not a human). The beacon detection process may include analyzing the communication patterns and frequencies of network interactions to identify behaviors characteristic of automated or malicious activities.

In particular, the analytics server 102 may examine the timing intervals between successive communication attempts from specific network identifiers. Regular, repetitive patterns-such as connections initiated precisely every X seconds or minutes—may indicate automated processes or beaconing behavior commonly associated with botnets or malware command-and-control communications. By establishing baseline network association patterns for normal activity, the system can detect deviations that suggest beaconing. For instance, the system may detect that a particular internal host is sending out network packets to an external IP address at exact five-minute intervals, which is unusual compared to human-generated traffic. The analytics server 102 may cross-reference this behavior with threat intelligence feeds 222 to determine if the external IP address is associated with known malicious actors.

Additionally, the system may employ machine learning models to distinguish between legitimate automated processes (e.g., scheduled backups or health checks) and malicious beaconing by considering factors such as the destination address reputation, payload content, and correlation with user activity logs, as discussed elsewhere herein.

The system may also identify any traffic records labelled with a "Demised" connection status (identified via the mappings from the connection inventory as discussed above). Such traffic relationship records identify demised network connections that are actually still being utilized in the network. Such traffic could therefore represent a high risk to the private network infrastructure. In an implementation, the system may output a report identifying any such traffic relationships. By identifying these relationships, network operators are able to take suitable measures to suppress such traffic, for example by removing firewall rules allowing these connections. The system may also automatically deploy configuration changes, such as altering firewall rules, to suppress traffic that has been identified as associated with a demised connection.

The system may further identify traffic involving unknown third parties. In particular, any communication relationship records not tagged with a named entity by the above-described process may be identified as involving an unknown third party (e.g. by tagging the relationships with a special "unknown" tag). The system may allow the user to view those communication relationship records (or aggregated information about those relationship records) and/or inspect the traffic records (e.g. device logs) on which those communication relationship records were based. Traffic with unknown parties may often pose a significant security risk, so identifying this can allow network operators to perform further investigations, and/or implement security measures, such as configuring firewall rules to block the traffic. In some implementations, the system may automatically configure security measures, such as configuring firewalls to block unknown traffic or configuring network monitors to record additional information about such traffic.

Name Normalization

In preferred implementations, a name normalization process is used to normalize entity names obtained from the network registries and the third-party network connection inventory to increase the chances of matching entities. In an example implementation, the steps for normalizing organization/entity names may include converting names to all lower case (or equivalently, all upper case); removing all punctuation or other non-alphabetical symbols; removing all numbers; removing all abbreviations related to company legal entity (such as "inc", "pl", "plc", "llc", "corp", etc); removing all remaining whitespace; or a combination thereof.

Process for Fuzzy Matching of Names

As discussed above, when matching records from the third-party network connection inventory against network registry data, a fuzzy matching process may be applied to allow for matches based on very similar names, not just identical names. The fuzzy matching process may be applied without name normalization, but in preferred implementations, name normalization is used in combination with fuzzy matching for both names being compared.

In one implementation, the fuzzy matching process receives as input two normalized names. It then performs a Jaro-Winkler string comparison calculation against the normalized names. The process considers the names to match if the comparison score is above a configured threshold (such as 0.90), in which case the process outputs a value (e.g. "True") indicating a match; otherwise the process outputs a value indicating the names do not match (e.g. "False"). Note other string similarity/distance metrics can be used instead of the Jaro-Winkler metric.

The system can provide summaries of identified communication relationships via an application (e.g. a native or web application on user device 104). In one example, outputs are generated by running the analytics program offline to generate traffic summaries (for example summarised traffic statistics for various communication relationships and/or various named third-party entities), and the generated results can be viewed using a suitable data visualisation platform, for example a Jupyter notebook or Databricks. In other implementations a self-service interactive user application may be provided allowing a user to control and configure data collection, analysis and/or result generation.

Additional Operations of the System

Additional operations, that may be performed by the system, such as by the server 102 are described herein. Certain operations may be exemplary applications of one or more techniques discussed above and/or may be used in combination with one or more of the techniques described above, as one skilled in the art may appreciate.

In certain implementations, the analytics server 102 may receive network traffic data from the private network infrastructure 110, where the network traffic data includes records of communication events involving network identifiers, such as IP addresses and domain names. The analytics server 102 may determine, based on the network traffic data, communication relationships between network entities identified by the network identifiers. These communication relationships may be stored in the network traffic relationships database 210.

The analytics server 102 may access a plurality of entity identifiers associated with known third-party systems 126, 128. These entity identifiers may be stored in the third-party network connection inventory (TPNCI) database 202 and may include names of third-party organizations that have known interactions with the private network infrastructure 110. For example, these third-party organizations may include payment processing providers, vulnerability management vendors, or other external services that interact with the organization's network systems. In particular, the system utilizes fuzzy matching processes to accurately associate network identifiers with these entity identifiers despite discrepancies or variations in naming conventions.

The analytics server 102 may determine, using a fuzzy matching process, associations between at least a subset of the network identifiers and the entity identifiers by comparing the network identifiers to the entity identifiers, wherein the entity identifiers are associated with the known third-party systems. The fuzzy matching process allows the analytics server 102 to match network identifiers to entity identifiers even when there are variations in naming conventions, formats, or typographical errors. By employing fuzzy matching, the system can handle inconsistencies such as misspellings, abbreviations, and differing formats between the network identifiers found in the traffic data and the entity identifiers stored in the TPNCI database 202.

The associations may be used by the analytics server 102 to identify communication relationships involving the third-party systems. Communication relationships may include interactions between network entities, such as data transmissions, connection attempts, or DNS lookups, identified from the network traffic data. The analytics server 102 may identify these relationships by analyzing the network traffic data and mapping network identifiers to entity identifiers using the fuzzy matching process.

Based on the identified communication relationships, the analytics server 102 may determine unregistered or unknown third-party connections within the network infrastructure 110. For example, if the analytics server 102 detects communication events involving network identifiers that do not match any entity identifiers in the TPNCI database 202 through the fuzzy matching process, the server 102 may flag these as unregistered connections or perform one or more additional actions (e.g., automated actions). By analyzing these unknown connections, the system can identify potential security risks, such as unauthorized access attempts or malicious activities. For instance, a network identifier communicating with the private network infrastructure 110 that is not associated with any known third-party entity may indicate a possible intrusion or misconfiguration that requires investigation.

In certain implementations, the fuzzy matching process may include computing a string similarity metric between normalized versions of the network identifiers and the entity identifiers. For instance, the network identifiers and the entity identifiers may be normalized by converting the identifiers to a standard case (e.g., all lowercase, removing punctuation characters, removing numerical digits, removing legal entity abbreviations (such as "Inc.", "LLC", "Corp."), removing whitespace characters, or a combination thereof. This normalization process reduces discrepancies caused by formatting variations and enhances matching accuracy by ensuring that the identifiers are in a consistent format before comparison.

In one implementation, the string similarity metric may be the Jaro-Winkler distance metric. The Jaro-Winkler metric measures the similarity between two strings, giving more weight to common prefixes and accounting for common typographical errors, making it effective for matching entity names with minor differences. The Jaro-Winkler distance is calculated based on the number of matching characters and the number of transpositions. Specifically, the Jaro-Winkler similarity score s between strings $s_1$ and $s_2$ may be defined as:

$$s = d_j + (l \times p \times (1 - d_j))$$

where $d_j$ is the Jaro distance between the strings, l is the length of the common prefix at the start of the string (e.g., up to 4 characters), and p is a constant scaling factor (e.g., set to 0.1 or similar). The Jaro distance $d_j$ may be determined based on the number of matching characters and the number of transpositions between the two strings $s_1$ and $s_2$.

In other implementations, determining the associations using the fuzzy matching process may further include generating feature vectors for the network identifiers and the entity identifiers based on character n-grams and tokenization. These feature vectors may be input into a machine learning model 218 trained to predict similarity scores. The associations are then determined based on the similarity scores exceeding a predefined threshold.

The feature vectors may include representations of the network identifiers and entity identifiers created by decomposing the strings into character n-grams (sequences of 'n' characters). For example, for $(n=3)$, the identifier "example" would be represented as the trigrams "exa," "xam," "amp," "mpl," "ple." Tokenization may involve splitting identifiers into tokens based on delimiters such as spaces or punctuation, thereby capturing meaningful components like words or abbreviations within the identifiers. These techniques capture the structural and sequential character information of the identifiers, allowing the machine learning model to analyze patterns and similarities between different identifiers.

The machine learning model may comprise a neural network configured to perform semantic analysis on the feature vectors to improve fuzzy matching accuracy. The neural network may be trained to capture contextual and semantic relationships between the network identifiers and the entity identifiers. It may utilize techniques such as word embeddings or character-level embeddings to represent the feature vectors effectively. In certain implementations, the neural network architecture may be selected from convolutional neural networks (CNNs), which can capture local patterns in the data; recurrent neural networks (RNNs), which are effective for sequential data; transformer-based models, which can capture long-range dependencies; and the like.

The machine learning model may be trained using supervised learning with a training dataset comprising known associations between network identifiers and entity identifiers. For example, the training dataset may include pairs of network identifiers and corresponding entity identifiers that have been verified as correct associations. During training, the model learns to predict similarity scores that indicate the likelihood of association. The training process may include feeding the feature vectors into the neural network and adjusting the network's parameters to minimize the difference between the predicted similarity scores and the actual labels in the training data. This iterative process helps the model generalize to new, unseen data, improving its ability to make accurate predictions in real-world scenarios.

The analytics server 102 may further be configured to assign confidence scores to the associations based on results of the fuzzy matching process. Assigning the confidence scores may involve calculating the scores directly from string similarity metrics produced by the fuzzy matching process and adjusting them based on additional factors including frequency of occurrence and contextual relevance. For example, an association with a high similarity score that appears frequently in the network traffic data may receive a higher confidence score. Contextual relevance, such as the recency of interactions or corroborating data from threat intelligence feeds, may also influence the confidence scores by increasing the weighting of associations that are more relevant to current network activities.

The analytics server 102 may filter the associations by retaining those with confidence scores above a predetermined confidence threshold and designating associations with confidence scores below the threshold for further analysis. For associations with low confidence scores, the analytics server 102 may maintain multiple potential entity identifiers for each network identifier, prioritize the multiple potential associations based on their confidence scores, and flag these associations for review by different teams within the organization based on assigned priorities. For instance, audit teams may require comprehensive reports including all potential associations, while operational teams may focus on associations with higher confidence scores. The system allows for flexible prioritization based on the needs of different stakeholders, ensuring that resources are allocated efficiently according to the organization's risk management strategies.

In some cases, a network identifier may match multiple entity identifiers due to similarities in names or identifiers, leading to collisions. A collision occurs when the fuzzy matching process associates a single network identifier with more than one entity identifier. The analytics server 102 may need to be configured to handle such collisions by analyzing overlapping associations and assigning collision scores based on the degree of overlap and confidence scores. For example, two different companies may have similar names, such as "Global Tech Solutions" and "Global Technologies Inc.," causing their network identifiers to have high similarity scores with each other. The analytics server 102 may use additional data points, such as corroborating network activities, historical communication patterns, or external data sources like WHOIS records, to resolve collisions and accurately map the network identifiers to the correct entity identifiers. By effectively handling collisions, the system enhances the accuracy of the associations and reduces the risk of misattribution.

In certain implementations, the analytics server 102 may further include receiving additional data from one or more external data sources 220, including network registry information, domain ownership records, and IP address ownership records. These external data sources may include one or more of network registries 122, 124, domain WHOIS databases 214, IP WHOIS databases 216, or a combination thereof. The analytics server 102 may determine the associations at least in part based on the additional data. For example, the system may process the domain and IP WHOIS data to extract registrant names, IP address ranges, and domain names associated with various entities. This information may be extracted by parsing the WHOIS records to identify fields such as "Registrant Name," "Organization," "Domain Name," "IP Address Range," and so on.

Determining the associations may include processing the additional data using a machine learning model 218 configured to extract relevant network identifiers and entity identifiers. The machine learning model 218 may apply natural language processing (NLP) techniques to parse unstructured or semi-structured data. For instance, the NLP module 226 may analyze registration records that may contain free-form text or inconsistent formatting, extract entity names and associated network identifiers, and normalize the extracted information before updating the associations. This allows the analytics server 102 to handle a wide range of data formats, including records with inconsistent structures or languages, improving the accuracy of the associations.

The system may integrate further data sources, including threat intelligence feeds 222, to enhance analysis of network traffic data and improve detection of malicious activities. Integrating threat intelligence feeds may involve receiving indicators of compromise (IOCs) 224 from one or more of the threat intelligence feeds 22, wherein the IOCs 224 include malicious IP addresses, malicious domains, attack signatures, or a combination thereof. The analytics server 102 may correlate the IOCs 224 with network identifiers in the network traffic data by matching IP addresses or domains observed in the network traffic with those listed in the IOCs. Upon finding matches with IOCs, the system updates the associations and communication relationships to reflect the potential threat and adjusts confidence scores to reflect the increased risk associated with compromised identifiers.

For example, if a malicious IP address known for distributing malware is detected communicating with the private network infrastructure 110, the analytics server 102 may flag this communication relationship and increase the confidence score that this interaction is associated with a security threat. Additional actions may include generating alerts for security personnel to initiate an investigation or applying automated responses to mitigate the potential threat.

In certain implementations, the analytics server 102 may use the associations to identify additional network identifiers related to the entity identifiers. For example, once an IP address range is associated with an entity identifier, the analytics server 102 may query the network traffic relationships database 210 to find domains, hostnames, or other network identifiers linked to that IP range. This process may involve searching for communication relationships where the IP addresses within the range are involved, thereby identifying additional domains or services used by the entity.

The analytics server 102 may update the network traffic data and communication relationships with the additional network identifiers. This enriched dataset provides a more detailed view of the network interactions and dependencies, allowing for a more comprehensive understanding of the entity's presence within the network.

The fuzzy matching process may be repeated with the updated set of network identifiers to refine the associations. By iteratively incorporating newly discovered identifiers into the matching process, the analytics server 102 can uncover previously unknown domains or IP addresses associated with known third parties. This iterative enrichment enhances the accuracy and completeness of the network mapping and is crucial for effective monitoring and security analysis. For instance, the system may discover that a third-party vendor uses additional subdomains not initially identified, allowing the organization to adjust security policies accordingly.

In certain implementations, the analytics server 102 may build current network association patterns for the entity identifiers based on the associations. Each current network association pattern may represent communication behaviors associated with a specific entity identifier.

Building the current network association patterns may include aggregating communication relationships associated with each entity identifier over a predefined time window, such as daily or hourly intervals. The analytics server 102 calculates statistical metrics including communication frequency (e.g., number of connections per unit time), data transfer volumes (e.g., total bytes sent and received), connection timings (e.g., time of day when communications occur), and common communication counterparts (e.g., specific internal hosts frequently communicating with the entity). These aggregated data are stored as the current network association pattern for the entity identifier. For example, the system may determine that an entity typically communicates with specific servers during business hours with low data volumes, forming a baseline pattern.

The analytics server 102 may further establish baseline network association patterns for the entity identifiers based on historical network traffic data. Establishing the baseline network association patterns includes analyzing historical communication relationships over an extended time period, such as the past several months. The analytics server 102 determines typical communication behaviors based on this historical data, including regular connection intervals (e.g., weekly updates), standard data volumes (e.g., average bytes transferred), and consistent communication partners (e.g., specific internal departments). These derived metrics are stored as the baseline network association pattern for each entity identifier, serving as a reference for normal activity.

The analytics server 102 may compare the current network association patterns to the baseline network association patterns for the entity identifiers and detects one or more anomalies based on the comparison. Detecting the anomalies can include identifying deviations in communication frequency exceeding a predefined threshold, such as a sudden increase in connection attempts. Anomaly detection can also include detecting unusual data transfer volumes or patterns not present in the baseline network association patterns, such as large data exfiltration events. Additionally, recognizing new communication partners or destinations not previously associated with the entity identifier may indicate unauthorized access or lateral movement within the network.

The analytics server 102 may flag significant deviations for further investigation. In response to detecting the anomalies, the system may perform at least one automated action, such as generating an alert for security personnel, automatically updating security policies or firewall rules to mitigate potential threats, or isolating affected network entities or connections pending further investigation. For example, if the system detects that a third-party vendor is suddenly transferring large amounts of data outside of normal business hours, it may generate an alert and temporarily restrict the data flow until the activity is verified as legitimate.

In certain implementations, the analytics server 102 may detect collisions between network association patterns associated with different entity identifiers by identifying network identifiers that match multiple entity identifiers in the fuzzy matching process. Detecting collisions may include analyzing overlapping associations where a network identifier is linked to multiple entity identifiers. The analytics server 102 can assign collision scores based on the degree of overlap and confidence scores. For example, if a network identifier has high similarity scores with two different entity identifiers, the system calculates collision scores that reflect the uncertainty. The analytics server 102 prioritizes collisions for resolution based on potential impact, such as focusing on collisions involving critical systems or high-risk entities.

The analytics server 102 can analyze the collisions to identify potential security risks by evaluating patterns indicative of overlapping associations, assessing the confidence scores associated with the collisions, and prioritizing collisions for resolution based on potential impact. For instance, if a network identifier associated with financial transactions collides with multiple entities, it may require immediate attention. Identifying potential security risks includes detecting patterns indicative of spoofing, masquerading, or hostile obfuscation attempts. The analytics server 102 cross-references the collisions with known threat intelligence indicators and escalates suspicious collisions for security intervention. For example, if threat intelligence feeds indicate that a malicious actor is impersonating a legitimate entity by using similar domain names, the system flags the collision and alerts security personnel to investigate potential phishing or man-in-the-middle attacks.

In certain implementations, the analytics server 102 may compare current security policies and firewall rules to the communication relationships identified for each entity identifier. The security policy comparison module 232 can retrieve existing firewall rules related to a specific third-party system, analyze the rules to determine permitted network identifiers and connection parameters, and compare the permitted network identifiers and connection parameters with the actual communication relationships observed in the network traffic data.

The analytics server 102 identifies discrepancies between allowed connections and observed access patterns and determines an updated security rule based on the discrepancies. For instance, if the observed access patterns involve network identifiers not specified in the current security policies, the system formulates a security rule that restricts or permits access based on the observed communication relationships.

If the analytics server 102 detects that an entity identifier marked as demised still has active connections, it generates an updated security rule to revoke access for the demised entity identifier and presents the updated security rule via an alert to security personnel for implementation. This can help ensure that, e.g., former vendors do not retain unintended access to the network, maintaining the security and integrity of the network infrastructure 110.

The system detects network patterns that have no known associated or approved vendor by identifying communication relationships involving network identifiers not associated with any entity identifier through the fuzzy matching process and flagging these unidentified connections as potential security risks. For example, communications with unknown external IP addresses may indicate unauthorized data exfiltration or command-and-control activities by malicious actors.

The analytics server 102 may determine updated security policies, updated firewall rules, or a combination thereof based on the identified unregistered or unauthorized communication relationships by generating recommendations for policy modifications, specifying the network identifiers and entities involved, and providing rationale based on the analysis results. Updating security policies may include automatically generating firewall rule updates to block unauthorized connections by adding deny rules for specific network identifiers, restrict access to only approved network identifiers associated with verified entity identifiers, tighten overly permissive rules by replacing broad allowances with specific permissions, or a combination thereof. For example, if a firewall rule currently allows all outbound traffic to any external IP address on a certain port, the system may recommend modifying the rule to allow traffic only to specific, verified IP addresses required for business operations.

In certain implementations, the analytics server 102 may provide an event stream or application programming interface (API) 234 to integrate with external systems. The event stream or API 234 may deliver real-time notifications of detected anomalies, unregistered connections, security policy recommendations, or a combination thereof. The API 234 may be utilized by internal systems to automatically adjust security policies or firewall rules based on the notifications, update internal dashboards or monitoring tools with real-time data, trigger automated response workflows within the organization's security infrastructure, and the like. For example, upon receiving an anomaly notification, an internal system may automatically adjust firewall settings to block a suspicious IP address or update a dashboard to reflect the current security status. Additionally or alternatively, the API may be utilized by external systems to receive alerts and notifications for third-party security management, enable coordination with external security service providers for threat mitigation, and facilitate compliance reporting by providing access to relevant security events and policies. For instance, a third-party vendor may use the API to receive notifications about potential security issues affecting their services within the organization's network, allowing them to take timely corrective actions.

In certain implementations, the analytics server 102 may optimize data storage and retrieval by aggregating the network traffic data over predetermined time windows to reduce data volume. The data aggregation and storage module 236 summarizes events by counts, byte transfer totals, and timestamp ranges for each unique combination of source and destination network identifiers. Aggregating the network traffic data includes summarizing events by counts, data volumes, and time intervals for each unique source-destination pair, indexing aggregated data to enable rapid lookups based on network identifiers or entity identifiers, and periodically purging or archiving old data to maintain system scalability. For example, the system may aggregate data into five-minute intervals, reducing data volume by up to 90% while retaining essential information for analysis. Caching mechanisms may be utilized to improve data access performance, allowing the analytics server 102 to handle large-scale data processing efficiently. By reducing data volume through aggregation and organizing data for optimized access, the analytics server 102 can process terabytes of data efficiently, support high-performance analysis, and provide real-time security monitoring capabilities crucial for timely detection and response to security events.

In certain implementations, the analytics server 102 may employ machine learning models to continuously improve the accuracy of the fuzzy matching and anomaly detection over time. The machine learning training module 238 retrains models with new data and feedback from prior analyses, allowing the system to adapt to evolving network behaviors and threat landscapes.

The machine learning models may includes using unsupervised learning methods to detect new patterns or clusters in the network traffic data, deploying reinforcement learning to optimize security responses based on the effectiveness of past actions, and integrating natural language processing (NLP) for enhanced analysis of textual identifiers and metadata. For instance, unsupervised learning algorithms may cluster network activities to identify previously unknown communication patterns, while reinforcement learning algorithms adjust security policies based on feedback regarding successful threat mitigations.

Integrating NLP can include utilizing entity recognition techniques to identify and extract relevant entities from unstructured data sources, applying sentiment analysis to assess the urgency or severity of alerts and reports, using topic modeling to categorize network events and anomalies, and enhancing feature representations used in machine learning models through contextual embeddings derived from textual data. For example, the analytics server 102 may analyze email communications or incident reports to extract key information that informs security decisions.

In certain implementations, the analytics server 102 may secure operations from unauthorized access or tampering by implementing authentication protocols for access to the system and data, enforcing role-based access controls to restrict user permissions, encrypting sensitive data both in transit and at rest, and auditing and logging system activities for compliance and forensic purposes. For example, multi-factor authentication and strict password policies may be used to control access to the analytics server 102. Role-based access controls ensure that users have appropriate permissions based on their job functions, preventing unauthorized access to sensitive information.

Sensitive data, such as network identifiers, security policies, and analysis results, are encrypted using industry-standard encryption algorithms when stored on disk and when transmitted over networks. The analytics server 102 maintains detailed audit logs of system activities, including user access, configuration changes, and data processing events. These logs support compliance with regulatory requirements and provide valuable information for forensic investigations in the event of a security incident.

In certain implementations, the network traffic data may include logs from at least one of firewalls 114, web proxies 116, endpoint detection and response systems, DNS servers, and network devices within the private network infrastructure 110. These logs provide detailed records of network activities, such as connection attempts, data transfers, and DNS queries, which are essential for analyzing communication events and detecting anomalies. The network identifiers may include at least one of IP addresses, domain names, hostnames, process identifiers, and media access control (MAC) addresses. These identifiers represent network entities at various levels, from hardware devices to software processes, and are critical for mapping communication relationships and identifying entities involved in network traffic.

Determining the communication relationships may include representing the communication relationships in a graph database, wherein nodes represent the network entities identified by the network identifiers, and edges represent the communication events or relationships between the network entities, including attributes such as communication type (e.g., HTTP request, SSH connection), frequency, and data volume. For example, the graph database may illustrate that a particular server (node) has established multiple connections (edges) to a set of client devices during specific time periods.

Using a graph database allows the analytics server 102 to efficiently model complex network interactions, perform advanced queries, and visualize relationships, enabling security analysts to quickly identify patterns, anomalies, or potential security threats. The graphical representation aids in understanding the network's topology and the flow of data, which is crucial for effective security monitoring and incident response.

In certain implementations, the client device 104 may access the analytics server 102 through a browser 106 or a dedicated application, providing interactive dashboards and interfaces. These dashboards allow security teams to monitor real-time network activity, review findings, drill down into specific incidents, and manage responses.

Users may be able to customize views and reports according to their roles and responsibilities, facilitating efficient investigation and decision-making. For example, an analyst may focus on anomaly alerts and visualizations of network traffic patterns, while an auditor may review detailed logs, compliance reports, and historical data. The interface may provide visualization tools, such as graphs, charts, and heat maps, to help users understand complex data and identify trends. Additionally, dashboards may include alert management features, allowing users to acknowledge, assign, and track the resolution of security events.

Example Data Representations

The tables of FIGS. 7A-7G illustrate example data schemas used in example implementations of the described system.

The Network Traffic Relationships schema (FIG. 7A) describes the various relationship types that are captured in the network traffic relationship database and are made available for optimized queries.

The Third Party Network Connections (TPNC) schema (FIG. 7B) describes the relevant fields that are utilized for third-party network connection queries with the name and status being the most useful. The name field stores the entity name and is utilized for fuzzy matching against domain and network address WHOIS databases. The status field provides the status information about the connection such as "Active" or "Demised".

Domain and IP Whois schemas (FIGS. 7C/7D) represent domain name and IP address ownership information obtained from the network registries. This is useful for tying TPNCs to observable network indicators that can be found in network logs, and which can be explicitly observed and measured on the network.

EDR (FIG. 7E), Web Proxy (FIG. 7F), and Firewall (FIG. 7G) schemas show the relevant fields from these original log data sources. These logs are utilized to capture various types of network traffic relationships. The system reads information from the various logs and populates these tables with the required information, which is then used as a basis for constructing the traffic relationship table. Other similar data schemas may be implemented for other traffic data and log sources.

Example Method

FIG. 8 depicts a method for analysing network traffic data according to one aspect of the present disclosure. The method 800 may be implemented on a computer system, such as the system 100. For example, the method 800 may be implemented by the analytics server 102. The method 800 may also be implemented by a set of instructions stored on a computer readable medium that, when executed by a processor, cause the computing device to perform the method 800. Although the examples below are described with reference to the flowchart illustrated in FIG. 8, many other methods of performing the acts associated with FIG. 8 may be used. For example, the order of some of the blocks may be changed, certain blocks may be combined with other blocks, one or more of the blocks may be repeated, and some of the blocks may be optional.

At block 802, the method includes receiving network traffic data from a network infrastructure, the network traffic data including records of communication events involving network identifiers. For example, the analytics server 102 may receive network traffic data from a network infrastructure, where the network traffic data includes records of communication events involving network identifiers.

At block 804, the method includes determining, based on the network traffic data, communication relationships between network entities identified by the network identifiers. For example, the analytics server 102 may determine communication relationships between network entities identified by the network identifiers based on the network traffic data. In certain implementations, determining the communication relationships includes representing the communication relationships in a graph database, where nodes represent the network entities identified by the network identifiers, and edges represent the communication events or relationships between the network entities, including attributes such as communication type, frequency, and data volume.

At block 806, the method includes accessing a plurality of entity identifiers associated with known third-party systems. For example, the analytics server 102 may access a plurality of entity identifiers associated with known third-party systems.

At block 808, the method includes determining, using a fuzzy matching process, associations between at least a subset of the network identifiers and the entity identifiers by comparing the network identifiers to the entity identifiers, where the entity identifiers are associated with the known third-party systems. For example, the analytics server 102 may determine associations between network identifiers and entity identifiers associated with known third-party systems by using a fuzzy matching process to compare the network identifiers to the entity identifiers. In certain implementations, the fuzzy matching process includes computing a string similarity metric between normalized versions of the network identifiers and the entity identifiers. For example, normalizing the identifiers may involve converting the identifiers to a standard case, removing punctuation characters, removing numerical digits, removing legal entity abbreviations, removing whitespace characters, or a combination thereof. As another example, the string similarity metric may be a Jaro-Winkler distance metric.

Alternatively, determining the associations using the fuzzy matching process may further include generating feature vectors for the network identifiers and the entity identifiers based on character n-grams and tokenization, inputting the feature vectors into a machine learning model trained to predict similarity scores, and determining the associations based on the similarity scores exceeding a predefined threshold. Furthermore, the method may include assigning confidence scores to the associations based on one or more string similarity metrics from the fuzzy matching process, and retaining associations with confidence scores above a predetermined confidence threshold.

In certain implementations, the method further includes receiving additional data from one or more external data sources, the additional data including network registry information, domain ownership records, IP address ownership records, or a combination thereof, and determining the associations at least in part based on the additional data. For example, the analytics server 102 may receive additional data from external data sources and use the additional data to determine the associations. In some cases, determining the associations includes processing the additional data using a machine learning model configured to extract relevant network identifiers and entity identifiers, and updating the associations based on the extracted information. Processing the additional data using the machine learning model may involve applying natural language processing techniques to parse unstructured or semi-structured data, extracting entity names and associated network identifiers from the additional data, and normalizing the extracted entity names and network identifiers before updating the associations. In certain implementations, the external data sources comprise one or more threat intelligence feeds, and determining the associations based on the additional data includes receiving indicators of compromise (IOCs) from the threat intelligence feeds, where the IOCs include malicious IP addresses, malicious domains, attack signatures, or a combination thereof, correlating the IOCs with network identifiers in the network traffic data, and updating associations and communication relationships based on matches with IOCs.

At block 810, the method includes determining, based on the associations, communication relationships involving the third-party systems. For example, the analytics server 102 may determine communication relationships involving the third-party systems based on the associations.

At block 812, the method includes determining, based on the identified communication relationships, unregistered or unknown third-party connections within the network infrastructure. For example, the analytics server 102 may determine unregistered or unknown third-party connections within the network infrastructure based on the identified communication relationships.

At block 814, the method includes using the associations to identify additional network identifiers related to the entity identifiers, updating the network traffic data and communication relationships with the additional network identifiers, and repeating the fuzzy matching process with the updated set of network identifiers to determine updated associations. For example, the analytics server 102 may expand the set of network identifiers by identifying additional identifiers related to the entity identifiers, update the network traffic data and communication relationships, and perform the fuzzy matching process again with the updated data to refine the associations.

At block 816, the method includes building current network association patterns for the entity identifiers based on the associations, where each current network association pattern represents communication behaviors associated with a specific entity identifier. For example, the analytics server 102 may build current network association patterns by aggregating communication relationships associated with each entity identifier over a predefined time window, calculating statistical metrics including communication frequency, data transfer volumes, connection timings, and common communication counterparts, and storing the aggregated data as the current network association pattern for the entity identifier.

At block 818, the method includes establishing baseline network association patterns for the entity identifiers based on historical network traffic data. For example, the analytics server 102 may analyze historical communication relationships over an extended time period, determine typical communication behaviors including regular connection intervals, standard data volumes, and consistent communication partners, and store the derived metrics as the baseline network association pattern for each entity identifier.

At block 820, the method includes comparing the current network association patterns to the baseline network association patterns for the entity identifiers and detecting one or more anomalies based on the comparison. For example, the analytics server 102 may detect anomalies by recognizing new communication partners or destinations not previously associated with the entity identifiers. In response to detecting the anomalies, the method may include performing at least one automated action, such as generating an alert, automatically updating security policies or firewall rules to mitigate potential threats, isolating affected network entities or connections pending further investigation, or a combination thereof.

At block 822, the method includes detecting collisions between network association patterns associated with different entity identifiers by identifying network identifiers that match multiple entity identifiers in the fuzzy matching process. For example, the analytics server 102 may analyze overlapping associations where a network identifier is linked to multiple entity identifiers, and assign collision scores based on the degree of overlap.

At block 824, the method includes comparing current security policies and firewall rules to the communication relationships identified for each entity identifier, identifying discrepancies between allowed connections and observed access patterns, and determining an updated security rule based on the discrepancies. For example, the analytics server 102 may retrieve existing firewall rules related to a specific third-party system, analyze the rules to determine permitted network identifiers and connection parameters, and compare the permitted network identifiers and connection parameters with the actual communication relationships observed in the network traffic data. In certain implementations, determining an updated security rule involves identifying that the observed access patterns involve network identifiers not specified in the current security policies, and determining the updated security rule to restrict or permit access based on the observed communication relationships. As another example, the method may detect an entity identifier that is identified as demised with one or more active connections, and determine an updated security rule to revoke access for the demised entity identifier.

At block 826, the method includes providing an application programming interface (API) to integrate with external systems, where the API delivers real-time notifications of detected anomalies, unregistered connections, security policy recommendations, or a combination thereof. For example, the analytics server 102 may provide an API that external systems can use to receive real-time updates.

Example Computer System

Figure 9:
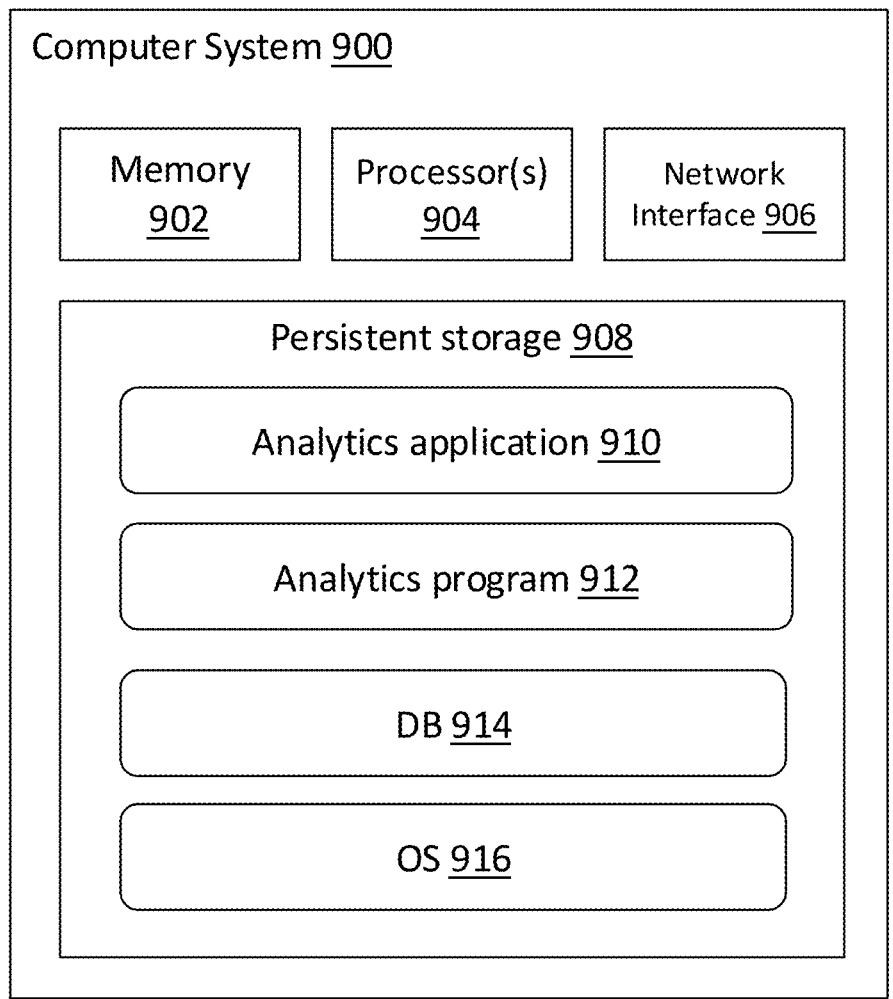
FIG. 9 illustrates a computer device for performing described data processing operations according to one aspect of the present disclosure.

FIG. 9 illustrates an example computer system 900 that may be utilized to implement one or more of the devices and/or components discussed herein, such as the analytics server 102, client device 104, devices of the private network infrastructure 110, databases 108, third-party systems 126 and 128, network registries, or any other suitable device. In particular embodiments, one or more computer systems 900 perform one or more steps of one or more methods described or illustrated herein. In particular embodiments, one or more computer systems 900 provide the functionalities described or illustrated herein. In particular embodiments, software running on one or more computer systems 900 performs one or more steps of one or more methods described or illustrated herein or provides the functionalities described or illustrated herein. Particular embodiments include one or more portions of one or more computer systems 900. Herein, a reference to a computer system may encompass a computing device, and vice versa, where appropriate. Moreover, a reference to a computer system may encompass one or more computer systems, where appropriate.

This disclosure contemplates any suitable number of computer systems 900. This disclosure contemplates the computer system 900 taking any suitable physical form. As an example and not by way of limitation, the computer system 900 may be an embedded computer system, a system-on-chip (SoC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, a smartphone or other mobile device, a client device operated by security personnel, an augmented/virtual reality device, or a combination of two or more of these. Where appropriate, the computer system 900 may include one or more computer systems 900; be unitary or distributed; span multiple locations; span multiple machines; span multiple data centers; be deployed on-premises or in cloud environments; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 906, memory 904, storage 908, an input/output (I/O) interface, and a communication interface. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 906 includes hardware for executing instructions, such as those making up a computer program. As an example and not by way of limitation, the processor 906 may retrieve (or fetch) the instructions from an internal register, an internal cache, memory 904, or storage 908; decode and execute the instructions; and then write one or more results to an internal register, internal cache, memory 904, or storage 908. In particular embodiments, the processor 906 may include one or more multi-core CPUs, graphics processing units (GPUs), specialized neural processing units (NPUs) for accelerating machine learning computations, field-programmable gate arrays (FPGAs), application-specific integrated circuits (ASICs), or any other suitable processing units. This disclosure contemplates the processor 906 including any suitable number of any suitable internal caches, where appropriate. The processor 906 may include hardware accelerators or programmable network processors to handle specific tasks such as packet inspection, encryption/decryption, pattern matching, AI inference, or other specialized computations necessary for handling large-scale data processing. Although this disclosure describes and illustrates a particular processor, this disclosure contemplates any suitable processor.

In particular embodiments, the memory 904 includes main memory for storing instructions for the processor 906 to execute or data for the processor 906 to operate on. As an example and not by way of limitation, computer system 900 may load instructions from storage 908 or another source (such as another computer system 900) to the memory 904. The processor 906 may then load the instructions from the memory 904 to an internal register or internal cache. To execute the instructions, the processor 906 may retrieve the instructions from the internal register or internal cache and decode them. During or after execution of the instructions, the processor 906 may write one or more results (which may be intermediate or final results) to the internal register or internal cache. The processor 906 may then write one or more of those results to the memory 904. In particular embodiments, the memory 904 includes volatile/random access memory (e.g., DRAM, SDRAM) for storing temporary data and software code being executed. The memory 904 may be optimized for high-bandwidth data transfer to support intensive data processing tasks. Memory 904 may include one or more memories 904, where appropriate. Although this disclosure describes and illustrates particular memory implementations, this disclosure contemplates any suitable memory implementation.

In particular embodiments, the storage 908 includes mass storage for data or instructions. As an example and not by way of limitation, the storage 908 may include hard disk drives (HDDs), optical storage, solid-state drives (SSDs), high-speed NVMe storage arrays, or any other suitable storage medium, or a combination of two or more of these. The storage 908 persistently stores software, data, and other materials for performing the described functions of the analytics server 102 or other components. For example, storage 908 may store the analytics application backend 910 (e.g., a web application backend), the analytics program 912 for gathering and analyzing traffic logs and other data using the described techniques, and database 914 for implementing databases 108 of FIG. 1. In particular embodiments, the analytics program 912 may be optimized to handle large-scale data processing using specialized data processing frameworks such as Apache Spark or Hadoop, enabling scalable and efficient analysis of terabytes of network traffic data. Storage 908 may include one or more storage 908 devices configured for high-performance, low-latency data access. Although this disclosure describes and illustrates particular storage, this disclosure contemplates any suitable storage.

In particular embodiments, the I/O interface includes hardware, software, or both, providing one or more interfaces for communication between computer system 900 and one or more I/O devices. The computer system 900 may include one or more of these I/O devices, where appropriate. One or more of these I/O devices may enable communication between a person (i.e., a user) and computer system 900. As an example and not by way of limitation, an I/O device may include a keyboard, monitor, mouse, touch screen, or any other suitable I/O device. In particular embodiments, the I/O interface may include devices such as network taps, port mirroring configurations on network switches, or specialized network appliances that enable the computer system 900 to receive raw network traffic data directly for real-time analysis. The I/O interface may include hardware accelerators or programmable network processors to handle high-speed data input/output operations required for processing large volumes of network traffic data. Although this disclosure describes and illustrates a particular I/O interface, this disclosure contemplates any suitable I/O interface or combination of I/O interfaces.

In particular embodiments, communication interface includes hardware, software, or both providing one or more interfaces for communication (such as, for example, packet-based communication) between computer system 900 and one or more other computer systems 900 or one or more networks. As an example and not by way of limitation, communication interface may include high-speed network adapters, such as 10 Gigabit Ethernet or higher, and may include specialized hardware for handling large volumes of network traffic data. Communication interface may facilitate communication with other system components, such as devices of the network infrastructure 110, client device 104, and network registries 122 and 124, over one or more networks (e.g., Local and/or Wide Area Networks, including the Internet). In some implementations, computer system 900 may be connected to network taps or port mirroring configurations on network switches to receive raw network traffic data directly for real-time analysis. Where appropriate, communication interface may include one or more communication interfaces. Although this disclosure describes and illustrates particular communication interface implementations, this disclosure contemplates any suitable communication interface implementation.

The computer system 900 may also include a bus. The bus may include hardware, software, or both and may communicatively couple the components of the computer system 900 to each other. As an example and not by way of limitation, the bus may include one or more high-speed interconnects such as PCI Express (PCIe) buses or Infini-Band to reduce data transfer latency between processors, memory, and storage devices. In high-performance implementations, using such high-speed buses enhances the system's ability to handle intensive data processing tasks efficiently. Although this disclosure describes and illustrates a particular bus, this disclosure contemplates any suitable bus or interconnect.

The computer system 900 may further include a server operating system 916 optimized for high-performance computing, and any other software and data needed for operating the server. The server operating system 916 may include configurations for efficient memory management, networking, and storage input/output operations to support intensive data processing tasks. The server operating system may be configured with virtualization and containerization technologies (e.g., Docker, Kubernetes) for flexible deployment and management.

In particular embodiments, database 914 may be provided at the computer system 900 to implement databases 108 of FIG. 1. In certain implementations, database 914 may comprise distributed database systems, such as NoSQL databases (e.g., Apache Cassandra, MongoDB) or graph databases (e.g., Neo4j) to store network traffic relationships and support complex queries required for fuzzy matching and anomaly detection processes. Alternatively, such databases may be implemented on a separate database server in communication with the computer system 900 via the network and communication interface. In large-scale deployments, the databases may be distributed across multiple servers or data centers to provide redundancy and high availability.

While a specific architecture is shown and described by way of example, any appropriate hardware/software architecture may be employed to implement the analytics system. In large-scale deployments, the computer system 900 may be part of a cluster of servers working together to process data in parallel, using distributed computing techniques to handle the volume of data generated by enterprise networks. This cluster may include load balancing mechanisms and fault tolerance features to ensure continuous operation and scalability.

Furthermore, functional components indicated as separate may be combined and vice versa. For example, the functions of the analytics server 102 may be performed by a single server or may be distributed across multiple servers. As a concrete example, the analytics application backend 910, analytics program, and database 914 could be implemented on separate servers. This separation allows for modular scaling of each component based on resource demands, enhancing the system's ability to handle large-scale network environments.

In some implementations, specialized network appliances or devices may be deployed within the network infrastructure 110 to perform initial data collection and preprocessing. For example, a specially configured router or network probe may be used to collect network traffic data and forward relevant information to the analytics server 102 for further analysis. These devices may include hardware accelerators or programmable network processors to handle packet inspection and filtering at line speeds.

The analytics application 910 may be a web application and thus may be implemented server-side by a web server providing back-end components for the application, with front-end components served for execution by a web browser at the client device 104. In addition, the computer system 900 may expose application programming interfaces (APIs) or event streams to allow integration with other systems, such as security information and event management (SIEM) systems, orchestration tools, or automated response systems. This enables the computer system 900 to act as a central hub in the organization's security infrastructure, providing real-time data and insights to various stakeholders.

To efficiently implement the described techniques, specialized computing devices may be utilized within the system to handle specific, resource-intensive tasks. One such implementation involves deploying devices that connect directly to network routers to perform real-time analysis of network traffic. These devices, often referred to as network security appliances or inline network security devices, are strategically positioned within the network infrastructure to monitor, analyze, and, if necessary, block network traffic based on the analytical findings.

In one example, a specialized hardware appliance is connected to a core router within the private network infrastructure 110. This device is equipped with high-speed processing capabilities and dedicated hardware components optimized for packet inspection and data analysis. By interfacing directly with the router, the device can capture network traffic as it flows through the network, allowing for immediate processing using the described fuzzy matching algorithms and machine learning models. This real-time analysis enables the system to detect and mitigate potential threats instantaneously, such as blocking unauthorized connections or flagging anomalies for further investigation.

Furthermore, these specialized devices may incorporate advanced hardware components such as application-specific integrated circuits (ASICs) and field-programmable gate arrays (FPGAs) to enhance performance and adaptability. For example, an inline network security appliance connected to a router might utilize ASICs designed specifically for high-speed packet processing and encryption/decryption tasks. These ASICs enable the device to perform deep packet inspection and execute the fuzzy matching algorithms in real time without introducing significant latency. Similarly, incorporating FPGAs allows the device to be reprogrammed in the field to update machine learning models and adapt to new network threats swiftly. The combination of these specialized hardware components ensures that the system can handle the vast amounts of network data efficiently, providing robust security analysis while maintaining optimal network performance.

In another example, the system employs network taps or port mirroring on routers and switches to duplicate network traffic to specialized devices for out-of-band analysis. These devices are connected to the router without impacting the normal flow of network traffic. The specialized devices analyze the mirrored traffic to identify communication patterns and discrepancies, leveraging their dedicated hardware accelerators and optimized software to handle the high throughput. By not being inline with the network traffic, these devices avoid introducing latency while still providing comprehensive monitoring and analysis capabilities. This setup is particularly useful for organizations that require minimal disruption to their network operations while maintaining a high level of security oversight.

The client device 104 may be a standard user device such as a personal desktop or laptop computer, tablet computer, smartphone, or other mobile device, running a web browser for accessing the web application (or alternatively running a bespoke local application). Security personnel can use the client device 104 to interact with the analytics server 102, access dashboards, receive alerts, and manage security policies. The client application may include features for data visualization, report generation, and incident response coordination.

In practice, to implement the system at scale, considerations may be made to optimize data storage and retrieval, as well as processing capabilities. The analytics server 102 may utilize in-memory data stores for caching frequently accessed data and implement data partitioning strategies to distribute the workload efficiently. Specialized hardware components, such as FPGA-based accelerators or ASICs, may be employed for specific tasks like encryption/decryption, pattern matching, or AI inference. Network optimization techniques, including the use of software-defined networking (SDN) and network function virtualization (NFV), can be leveraged to enhance data flow and processing efficiency.

Moreover, the computer system 900 may integrate with the organization's existing infrastructure through the use of standardized protocols and interfaces. It can be deployed in on-premises data centers or cloud environments, utilizing virtualization and containerization technologies (e.g., Docker, Kubernetes) for flexible deployment and management. Security measures may be implemented, including encryption of data at rest and in transit, authentication and authorization mechanisms, and compliance with relevant industry standards and regulations.

Herein, a computer-readable non-transitory storage medium or media may include one or more semiconductor-based or other types of integrated circuits (ICs) (e.g., FPGAs or ASICs), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Described techniques are broadly applicable to various forms of network traffic and other network-based interactions and events, including, for example network packets, email, SMS, call patterns, other discrete traffic, and other communication metadata. Implementations can provide high performance, for example allowing users to query the retrieved data and receive a quick response. As a result, this solution can be used at scale.

It will be understood that the present invention has been described above purely by way of example, and modification of detail can be made within the scope of the invention.

For example, while the described process uses network identifiers in the form of IP addresses and domain names, the techniques could be extended to user other types of network identifiers, such as hostnames, MAC addresses and the like. The system may use various forms of network identifiers that can be extracted from traffic data sources such as device logs and that are used to identify entities in the network (whether physical or logical entities, e.g. hosts, network devices, domains, processes, endpoints, virtual machines etc.)

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:

receiving network traffic data from a network infrastructure, the network traffic data including records of communication events involving network identifiers;

determining, based on the network traffic data, communication relationships between network entities identified by the network identifiers;

accessing a plurality of entity identifiers associated with known third-party systems;

determining, using a fuzzy matching process, associations between at least a subset of the network identifiers and the entity identifiers by comparing the network identifiers to the entity identifiers, wherein the entity identifiers are associated with the known third-party systems;

determining, based on the associations, communication relationships involving the third-party systems; and determining, based on the identified communication relationships, unregistered or unknown third-party connections within the network infrastructure.

2. The method of claim 1, wherein the fuzzy matching process comprises computing a string similarity metric between normalized versions of the network identifiers and the entity identifiers.

3. The method of claim 1, wherein determining the associations using the fuzzy matching process further comprises:

generating feature vectors for the network identifiers and the entity identifiers based on character n-grams and tokenization;

inputting the feature vectors into a machine learning model trained to predict similarity scores; and determining the associations based on the similarity scores exceeding a predefined threshold.

4. The method of claim 1, further comprising:

assigning confidence scores to the associations based on one or more string similarity metrics from the fuzzy matching process; and retaining associations with confidence scores above a predetermined confidence threshold.

5. The method of claim 1, further comprising:

receiving additional data from one or more external data sources, the additional data including network registry information, domain ownership records, IP address ownership records, or a combination thereof; and determining the associations at least in part based on the additional data.

6. The method of claim 5, wherein the external data sources comprise one or more threat intelligence feeds, and wherein determining the associations based on the additional data comprises:

receiving indicators of compromise (IOCs) from one or more of the threat intelligence feeds, wherein the IOCs include malicious IP addresses, malicious domains, attack signatures, or a combination thereof;

correlating the IOCs with network identifiers in the network traffic data; and updating associations and communication relationships based on matches with IOCs.

7. The method of claim 1, further comprising:

using the associations to identify additional network identifiers related to the entity identifiers;

updating the network traffic data and communication relationships with the additional network identifiers; and repeating the fuzzy matching process with the updated set of network identifiers to determine updated associations.

8. The method of claim 1, further comprising building current network association patterns for the entity identifiers based on the associations, wherein each current network association pattern represents communication behaviors associated with a specific entity identifier.

9. The method of claim 8, further comprising establishing baseline network association patterns for the entity identifiers based on historical network traffic data.

10. The method of claim 8, further comprising:

comparing the current network association patterns to the baseline network association patterns for the entity identifiers; and detecting one or more anomalies based on the comparison.

11. The method of claim 10, wherein detecting the one or more anomalies comprises recognizing new communication partners or destinations not previously associated with the entity identifiers.

12. The method of claim 10, further comprising, in response to detecting the one or more anomalies, performing at least one automated action comprising generating an alert, automatically updating security policies or firewall rules to mitigate potential threats, isolating affected network entities or connections pending further investigation, or a combination thereof.

13. The method of claim 1, further comprising:

comparing current security policies and firewall rules to the communication relationships identified for each entity identifier;

identifying discrepancies between allowed connections and observed access patterns; and determining an updated security rule based on the discrepancies.

14. The method of claim 13, further comprising determining an updated security rule by:

identifying that the observed access patterns involve network identifiers not specified in the current security policies; and determining the updated security rule to restrict or permit access based on the observed communication relationships.

15. The method of claim 14, wherein determining an updated security rule comprises:

detecting an entity identifier that is identified as demised with one or more active connections; and determining the updated security rule to revoke access for the demised entity identifier.

16. A system comprising:

a processor; and memory storing instructions which, when executed by the processor, cause the processor to perform operations including:

receiving network traffic data from a network infrastructure, the network traffic data including records of communication events involving network identifiers;

determining, based on the network traffic data, communication relationships between network entities identified by the network identifiers;

accessing a plurality of entity identifiers associated with known third-party systems;

determining, using a fuzzy matching process, associations between at least a subset of the network identifiers and the entity identifiers by comparing the network identifiers to the entity identifiers, wherein the entity identifiers are associated with the known third-party systems;

determining, based on the associations, communication relationships involving the third-party systems; and determining, based on the identified communication relationships, unregistered or unknown third-party connections within the network infrastructure.

17. The system of claim 16, wherein the fuzzy matching process comprises computing a string similarity metric between normalized versions of the network identifiers and the entity identifiers.

18. The system of claim 16, wherein determining the associations using the fuzzy matching process further comprises:

generating feature vectors for the network identifiers and the entity identifiers based on character n-grams and tokenization;

inputting the feature vectors into a machine learning model trained to predict similarity scores; and determining the associations based on the similarity scores exceeding a predefined threshold.

19. The system of claim 16, further comprising:

assigning confidence scores to the associations based on one or more string similarity metrics from the fuzzy matching process; and retaining associations with confidence scores above a predetermined confidence threshold.

20. A non-transitory computer-readable medium storing instructions which, when executed by a processor, cause the processor to perform operations comprising:

receiving network traffic data from a network infrastructure, the network traffic data including records of communication events involving network identifiers;

determining, based on the network traffic data, communication relationships between network entities identified by the network identifiers;

accessing a plurality of entity identifiers associated with known third-party systems;

determining, using a fuzzy matching process, associations between at least a subset of the network identifiers and the entity identifiers by comparing the network identifiers to the entity identifiers, wherein the entity identifiers are associated with the known third-party systems;

determining, based on the associations, communication relationships involving the third-party systems; and determining, based on the identified communication relationships, unregistered or unknown third-party connections within the network infrastructure.

* * * * *